(12) United States Patent  
Jin et al.

(10) Patent No.: US 12,355,751 B2
(45) Date of Patent: Jul. 8, 2025

(54) METHOD AND RELATED APPARATUS FOR LOGGING IN TO IN-VEHICLE SYSTEM

(71) Applicant: SHENZHEN YINWANG INTELLIGENT TECHNOLOGIES CO., LTD., Shenzhen (CN)

(72) Inventors: Xinyao Jin, Nanjing (CN); Jun Wang, Nanjing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 202 days.

(21) Appl. No.: 17/939,804

(22) Filed: Sep. 7, 2022

(65) Prior Publication Data

US 2023/0006991 A1    Jan. 5, 2023

Related U.S. Application Data

(63) Continuation of application No. PCT/CN2020/078479, filed on Mar. 9, 2020.

(51) Int. Cl.
 *H04L 9/40* (2022.01)
 *H04L 67/12* (2022.01)

(52) U.S. Cl.
 CPC ...... *H04L 63/0815* (2013.01); *H04L 63/0876* (2013.01); *H04L 67/12* (2013.01)

(58) Field of Classification Search
 CPC ......... H04W 4/80; H04W 4/44; H04W 12/48; H04W 4/40
 USPC .......................................................... 726/5
 See application file for complete search history.

(56) References Cited

U.S. PATENT DOCUMENTS

| | | | |
|---|---|---|---|
| 10,218,695 | B1 | 2/2019 | Jain |
| 2014/0075517 | A1* | 3/2014 | Alrabady ............. G06F 21/572 726/4 |
| 2016/0307179 | A1 | 10/2016 | Zou et al. |
| 2017/0187707 | A1 | 6/2017 | Miu et al. |
| 2018/0213405 | A1 | 7/2018 | Jung et al. |
| 2018/0262891 | A1* | 9/2018 | Wu ..................... H04W 12/065 |
| 2018/0375855 | A1* | 12/2018 | Karaila .................. H04W 4/44 |
| 2019/0329733 | A1 | 10/2019 | Ahmad |
| 2021/0203498 | A1* | 7/2021 | Shin ...................... H04L 9/3226 |

FOREIGN PATENT DOCUMENTS

| | | |
|---|---|---|
| CN | 104601327 A | 5/2015 |
| CN | 105083214 A | 11/2015 |
| CN | 105490996 A | 4/2016 |
| CN | 105501031 A | 4/2016 |

(Continued)

OTHER PUBLICATIONS

Design of Smart Home Cloud Server, Yang Li, Dec. 2018 (Year: 2018).*

(Continued)

*Primary Examiner* — Jahangir Kabir
(74) *Attorney, Agent, or Firm* — Fish & Richardson P.C.

(57) ABSTRACT

Establishing, by a mobile terminal, a near field communication link to a vehicle, where the vehicle corresponds to the in-vehicle system; negotiating a login binding code with the vehicle through the near field communication link; and providing the login binding code to a network side device, where the login binding code is used by the network side device to verify whether the in-vehicle system can be logged in to with the first user account.

20 Claims, 17 Drawing Sheets

(56) References Cited

FOREIGN PATENT DOCUMENTS

| | | |
|---|---|---|
| CN | 107592627 A | 1/2018 |
| CN | 107733838 A | 2/2018 |
| CN | 107800708 A | 3/2018 |
| CN | 107895572 A | 4/2018 |
| CN | 108322507 A | 7/2018 |
| CN | 109033769 A | 12/2018 |
| CN | 110176093 A | 8/2019 |
| CN | 110198528 A | 9/2019 |
| JP | 2018074205 A | 5/2018 |
| WO | 2014172321 A1 | 10/2014 |
| WO | 2017097129 A1 | 6/2017 |
| WO | 2017207644 A1 | 12/2017 |
| WO | 2018161690 A1 | 9/2018 |

OTHER PUBLICATIONS

Use Cases of Implicit Authentication and Key Establishment with Sender and Receiver ID Binding, Forsberg, Jun. 2007 (Year: 2007).*
Office Action in Japanese Appln. No. 2022-553020, mailed on Oct. 24, 2023, 5 pages (with English translation).
Office Action in Chinese Appln. No. 202080097282.5, dated Dec. 12, 2022, 7 pages.
International Search Report and Written Opinion in International Appln. No. PCT/CN2020/078479, mailed on Dec. 1, 2020, 15 pages (with English translation).
Extended European Search Report in European Appln No. 20924813.7, dated Jun. 9, 2023, 10 pages.

* cited by examiner

METHOD AND RELATED APPARATUS FOR LOGGING IN TO IN-VEHICLE SYSTEM

CROSS-REFERENCE TO RELATED APPLICATIONS

This application is a continuation of International Application No. PCT/CN2020/078479, filed on Mar. 9, 2020, the disclosure of which is hereby incorporated by reference in its entirety.

TECHNICAL FIELD

This application relates to the field of connected vehicles and intelligent vehicles, and in particular, to a method and related apparatus for logging in to an in-vehicle system.

BACKGROUND

Currently, an in-vehicle system uses a login mechanism of a user account to implement personalized vehicle configuration for a user based on the user account. Refer to FIG. 1. The personalized configuration of the in-vehicle system includes a plurality of aspects such as autonomous driving data, driving behavior habit data, vehicle seat rearview mirror adjustment data and a driving mode. In other words, the user may log in to in-vehicle systems of different vehicles by using a user account of the user, and the different vehicles may also provide, based on personalized data of the user account, a driver with a service that conforms to a personal habit of the driver. This achieves intelligent vehicle use experience that "a vehicle understands me".

Currently, there are two login manners for the in-vehicle system.

In a first manner, as shown in FIG. 2, an app of a mobile phone is connected to a vehicle through Bluetooth. When an app of the mobile phone and the vehicle are within a Bluetooth near field communication range, data transmission and account verification are performed. After the data transmission and the account verification succeed, account login is completed. In this manner, if a vehicle end has no account information, account login cannot be completed until boarding. Therefore, login needs to be completed in advance, and the account information is stored locally. In addition, a Bluetooth near field communication manner is vulnerable to a relay attack. After a Bluetooth signal is intercepted, the Bluetooth signal may be copied to complete account login. In this case, if this account includes a vehicle control permission, the vehicle control permission is indirectly obtained.

In a second manner, as shown in FIG. 3, a user remotely sends an instruction via a mobile phone, and sends an instruction to a vehicle via a telematics service provider (telematics service provider, TSP). In this way, the vehicle completes remote login. In this manner, the user needs to determine a boarding time, and then completes account login in advance. Consequently, user experience is poor.

Therefore, both the foregoing two manners have unavoidable disadvantages. However, there is no in-vehicle system login manner currently that balances convenience and security.

SUMMARY

Embodiments of this application provide a method and related apparatus for logging in to an in-vehicle system, to provide a convenient and secure solution for logging in to the in-vehicle system.

According to a first aspect, a method for logging in to an in-vehicle system is provided, where the method is used for a mobile terminal to request to log in to the in-vehicle system with a first user account. The method includes: establishing, by the mobile terminal, a near field communication link to a vehicle, where the vehicle corresponds to the in-vehicle system; negotiating a login binding code with the vehicle through the near field communication link; and providing the login binding code to a network side device, where the login binding code is used by the network side device to verify whether the in-vehicle system can be logged in to with the first user account.

The method provided in the first aspect may be performed by the mobile terminal. The mobile terminal mentioned herein may be the mobile terminal device or an apparatus that may support the mobile terminal device in implementing a function of the method, for example, a chip system. For example, the mobile terminal device is a mobile phone.

In this embodiment of this application, the mobile terminal establishes the near field communication connection to the vehicle, and negotiates the login binding code with the vehicle through the near field communication link, so that the network side device verifies, based on the login binding code, whether the in-vehicle system may be logged in to with the first user account on the mobile terminal. In the method, the user does not need to determine a boarding time, and does not need to log in to the in-vehicle system with the first user account for the first time, so that operations are convenient. In addition, the login binding code is determined through negotiation between the mobile terminal and the vehicle. A near field communication association relationship between the vehicle and the mobile terminal can be verified by using the login binding code. This helps improve security of logging in to the in-vehicle system.

Solution 1: The login binding code may be generated by the network side device, for example, the network side device generates the login binding code based on at least one of the first user account, a mobile terminal identifier used to identify the mobile terminal, an in-vehicle system identifier used to identify the in-vehicle system, or a vehicle identifier used to identify the vehicle.

For the foregoing solution 1, there are a plurality of manners in which the mobile terminal negotiates a login binding code with the vehicle through the near field communication link. For example, the following manner 1 to manner 3 are used.

Manner 1: The mobile terminal is configured to: send a first login request message to the vehicle through the near field communication link; and receive, through the near field communication link, a login request feedback message returned by the vehicle, where the login request feedback message includes the login binding code, and the login binding code is requested from the network side device by the vehicle. The providing the login binding code to a network side device includes: sending a first verification request message to the network side device, where the first verification request message includes the login binding code, and the first verification request message further includes at least one of the first user account or the in-vehicle system identifier.

That is, in the manner 1, the login binding code determined through negotiation between the mobile terminal and the in-vehicle system is a login binding code requested from the network side device by the vehicle. The mobile terminal provides the login binding code to the network side device for verification. In the method, the user does not need to determine a boarding time, and does not need to log in to the in-vehicle system with the first user account for the first time, so that operations are convenient. In addition, the login binding code is determined through negotiation between the mobile terminal and the vehicle. An association relationship between the vehicle and the mobile terminal can be verified by using the login binding code. This helps improve security of logging in to the in-vehicle system.

Manner 2: The mobile terminal is configured to: send a first binding code application message to the network side device; receives a first binding code feedback message returned by the network side device, where the first binding code feedback message includes the login binding code; and sends a third verification request message to the vehicle through the near field communication link, where the third verification request message includes the login binding code. The providing the login binding code to a network side device includes: indirectly providing the login binding code to the network side device by sending the third verification request message to the vehicle.

That is, in the manner 2, the login binding code determined through negotiation between the mobile terminal and the in-vehicle system is a login binding code requested from the network side device by the mobile terminal. The mobile terminal indirectly provides the login binding code to the network side device for verification through the vehicle. In the method, the user does not need to determine a boarding time, and does not need to log in to the in-vehicle system with the first user account for the first time, so that operations are convenient. In addition, the login binding code is determined through negotiation between the mobile terminal and the vehicle. An association relationship between the vehicle and the mobile terminal can be verified by using the login binding code. This helps improve security of logging in to the in-vehicle system.

Manner 3: The mobile terminal is configured to: send a first binding code application message to the network side device; receive a first binding code feedback message returned by the network side device, where the first binding code feedback message includes the login binding code; and send a second login request message to the vehicle through the near field communication link, where the second login request message includes the login binding code. The providing the login binding code to a network side device includes: sending a first verification request message to the network side device, where the first verification request message includes the login binding code, and the first verification request message further includes at least one of the first user account or the in-vehicle system identifier.

That is, in the manner 3, the login binding code determined through negotiation between the mobile terminal and the in-vehicle system is a login binding code requested from the network side device by the mobile terminal. The mobile terminal provides the login binding code to the network side device (correspondingly, the vehicle may also provide the login binding code to the network side device) for verification. In the method, the user does not need to determine a boarding time, and does not need to log in to the in-vehicle system with the first user account for the first time, so that operations are convenient. In addition, the login binding code is determined through negotiation between the mobile terminal and the vehicle. An association relationship between the vehicle and the mobile terminal can be verified by using the login binding code. This helps improve security of logging in to the in-vehicle system.

Solution 2: The login binding code is generated by the mobile terminal, or is generated by the vehicle, or is generated by both the mobile terminal and the vehicle.

An example is as follows: there may be a plurality of manners in which the mobile terminal negotiates a login binding code with the vehicle through the near field communication link. For example, the mobile terminal generates a first login binding code and sends the first login binding code to the vehicle, where the first login binding code is a finally negotiated login binding code. Alternatively, the vehicle generates a first login binding code and sends the first login binding code to the mobile terminal, where the first login binding code is a finally negotiated login binding code. Alternatively, the mobile terminal generates a first login binding code and sends the first login binding code to the vehicle, and the vehicle generates a second login binding code based on the first login binding code, and sends the second login binding code to the mobile terminal, where the second login binding code is a finally negotiated login binding code. Alternatively, the vehicle generates a first login binding code and sends the first login binding code to the mobile terminal, and the mobile terminal generates a second login binding code based on the first login binding code, and sends the second login binding code to the vehicle, where the second login binding code is a finally negotiated login binding code. This is not limited in this embodiment of this application.

For the foregoing solution 2, that the mobile terminal provides the login binding code to a network side device includes: the mobile terminal sends a first verification request message to the network side device, where the first verification request message includes the login binding code, and the first verification request message further includes at least one of the first user account or the in-vehicle system identifier.

It should be understood that the login binding code is generated by the vehicle and/or the mobile terminal. The mobile terminal may send the login binding code to the network side device for verification. Alternatively, the vehicle may send the login binding code to the network side device for verification. An association relationship between the vehicle and the mobile terminal can be verified by using the login binding code. This helps improve security of logging in to the in-vehicle system.

With reference to the first aspect, in a possible implementation of the first aspect, the method further includes: logging in to a first application on the mobile terminal with the first user account, where the network side device is an application server of the first application.

The first application may be any application on the mobile terminal, for example, Baidu Map, AutoNavi Map, or another application. The application server corresponding to the first application verifies whether the in-vehicle system can be logged in to with the first user account via which the first application is logged in to, so as to avoid loss of user information in a process of sending the first user account to another server when another server is used. This improves user information security to some extent.

With reference to the first aspect, in a possible implementation of the first aspect, the method further includes: The mobile terminal receives a verification feedback message sent by the network side device.

That is, after completing the verification, the network side device may send the verification feedback message to the mobile terminal, for example, the verification feedback message about whether the verification succeeds or fails, so as to prompt the user that the login succeeds or fails.

With reference to the first aspect, in a possible implementation of the first aspect, the method further includes: The mobile terminal receives a login success message sent by the vehicle.

That is, after logging in to the in-vehicle system with the first user account, the vehicle sends the login success message to the mobile terminal, so as to prompt the user that the login to the in-vehicle system succeeds.

With reference to the first aspect, in a possible implementation of the first aspect, the first verification request message or the second login request message further includes at least one of the mobile terminal identifier or the vehicle identifier.

For example, the network side device may know the mobile terminal identifier. For example, after logging in to the first application with the first user account, the mobile terminal reports the mobile terminal identifier to the network side device, and then the network side device determines a correspondence between the first user account and the mobile terminal identifier. The first verification request message, including the mobile terminal identifier, can verify whether the in-vehicle system can be logged in to with the first user account more accurately. This helps improve login security of the in-vehicle system.

For another example, it is assumed that the network side device may know the vehicle identifier. For example, when the vehicle requests the login binding code from the network side device, the vehicle reports the vehicle identifier to the network side device. The first verification request message, including the vehicle identifier, can verify whether the in-vehicle system can be logged in to with the first user account. This helps improve login security of the in-vehicle system.

With reference to the first aspect, in a possible implementation of the first aspect, after the establishing a near field communication link to a vehicle, the method further includes: The mobile terminal sends, based on the near field communication link, an in-vehicle system startup request to the vehicle, where the in-vehicle system startup request is used to start the in-vehicle system.

In this embodiment of this application, the mobile terminal automatically starts the in-vehicle system through the near field communication link, so that operations are convenient.

For example, the in-vehicle system startup request is sent when a distance between the mobile terminal and the vehicle is less than a first threshold.

In this embodiment of this application, when determining that the distance between the mobile terminal and the vehicle is less than the first threshold, the mobile terminal sends the in-vehicle system startup request to the vehicle, to prevent start-up of the in-vehicle system from being accidentally triggered in a case that the mobile terminal is far away from the vehicle. Therefore, operations are convenient and security is high.

According to a second aspect, a method for logging in to an in-vehicle system is further provided, where the method is used to implement, on a vehicle, logging in to the in-vehicle system with a first user account, where the vehicle corresponds to the in-vehicle system, and the method includes: establishing a near field communication link to a mobile terminal, where the mobile terminal is configured to send a request for logging in to the in-vehicle system with the first user account; negotiating a login binding code with the mobile terminal through the near field communication link; providing the login binding code to a network side device, where the login binding code is used by the network side device to verify whether the in-vehicle system can be logged in to with the first user account; receiving a login indication message sent by the network side device, where the login indication message is used to indicate to log in to the in-vehicle system with the first user account; and logging in to the in-vehicle system with the first user account.

The method provided in the second aspect may be performed by the vehicle or an apparatus that may support the vehicle in implementing a function of the method. The apparatus is, for example, a chip system.

In this embodiment of this application, the vehicle establishes the near field communication connection to the mobile terminal, and negotiates the login binding code with the mobile terminal through the near field communication link, so that the network side device verifies, based on the login binding code, whether the in-vehicle system may be logged in to with the first user account on the mobile terminal. In the method, the user does not need to determine a boarding time, and does not need to log in to the in-vehicle system with the first user account for the first time, so that operations are convenient. In addition, the login binding code is determined through negotiation between the vehicle and the mobile terminal. An association relationship between the vehicle and the mobile terminal can be verified by using the login binding code. This helps improve security of logging in to the in-vehicle system.

Solution 1: The login binding code may be generated by the network side device. For example, the login binding code is generated by the network side device based on at least one of the first user account, a mobile terminal identifier used to identify the mobile terminal, an in-vehicle system identifier used to identify the in-vehicle system, or a vehicle identifier used to identify the vehicle.

For the foregoing solution 1, there are a plurality of manners in which the vehicle negotiates a login binding code with the mobile terminal through the near field communication link. For example, the following manner 1 to manner 3 are used.

Manner 1: The vehicle is configured to: receive a first login request message from the mobile terminal through the near field communication link; send a second binding code application message to the network side device; receive a second binding code feedback message returned by the network side device, where the second binding code feedback message includes the login binding code; and send a login request feedback message to the mobile terminal through the near field communication link, where the login request feedback message includes the login binding code. The providing the login binding code to a network side device includes: indirectly providing the login binding code to the network side device by sending the login request feedback message to the mobile terminal.

That is, in the manner 1, the login binding code determined through negotiation between the vehicle and the mobile terminal is a login binding code requested from the network side device by the vehicle. The vehicle indirectly provides the login binding code to the network side device for verification through the mobile terminal. In the method, the user does not need to determine a boarding time, and does not need to log in to the in-vehicle system with the first user account for the first time, so that operations are convenient. In addition, the login binding code is determined through negotiation between the vehicle and the mobile terminal. An association relationship between the vehicle and the mobile terminal can be verified by using the login binding code. This helps improve security of logging in to the in-vehicle system.

Manner 2: The vehicle is configured to: receive a first login request message from the mobile terminal through the near field communication link; send a second binding code application message to the network side device; receive a second binding code feedback message returned by the network side device, where the second binding code feedback message includes the login binding code; and send a login request feedback message to the mobile terminal through the near field communication link, where the login request feedback message includes the login binding code. The providing the login binding code to a network side device includes: sending a second verification request message to the network side device, where the second verification request message includes the login binding code, and the second verification request message further includes at least one of the first user account or the in-vehicle system identifier.

That is, the login binding code determined through negotiation between the vehicle and the mobile terminal is a login binding code requested from the network side device by the vehicle. The vehicle provides the login binding code to the network side device for verification. In the method, the user does not need to determine a boarding time, and does not need to log in to the in-vehicle system with the first user account for the first time, so that operations are convenient. In addition, the login binding code is determined through negotiation between the mobile terminal and the vehicle. An association relationship between the vehicle and the mobile terminal can be verified by using the login binding code. This helps improve security of logging in to the in-vehicle system.

Manner 3: The vehicle is configured to receive a third verification request message or a second login request message from the mobile terminal through the near field communication link, where the third verification request message or the second login request message includes the login binding code, and the login binding code is requested from the network side device by the mobile terminal. The providing the login binding code to a network side device includes: sending a second verification request message to the network side device, where the second verification request message includes the login binding code.

That is, in the manner 3, the login binding code determined through negotiation between the vehicle and the mobile terminal is a login binding code requested from the network side device by the mobile terminal. The vehicle provides the login binding code to the network side device (correspondingly, the mobile terminal may also provide the login binding code to the network side device) for verification. In the method, the user does not need to determine a boarding time, and does not need to log in to the in-vehicle system with the first user account for the first time, so that operations are convenient. In addition, the login binding code is determined through negotiation between the mobile terminal and the vehicle. An association relationship between the vehicle and the mobile terminal can be verified by using the login binding code. This helps improve security of logging in to the in-vehicle system.

Solution 2: The login binding code is generated by the mobile terminal, or is generated by the vehicle, or is generated by both the mobile terminal and the vehicle.

For the foregoing solution 2, providing, by the mobile terminal, the login binding code to a network side device includes: sending a second verification request message to the network side device, where the second verification request message includes the login binding code, and the second verification request message further includes at least one of the first user account or the in-vehicle system identifier.

It should be understood that the login binding code is generated by the vehicle and/or the mobile terminal. The mobile terminal may send the login binding code to the network side device, or the vehicle may send the login binding code to the network side device. An association relationship between the vehicle and the mobile terminal can be verified by using the login binding code. This helps improve security of logging in to the in-vehicle system by using a user account on the mobile terminal.

With reference to the first aspect, in a possible implementation of the first aspect, the network side device is an application server of a first application, and the first application is run on the mobile terminal to send a request for logging in to the in-vehicle system with the first user account.

The first application may be any application on the mobile terminal, for example, Baidu Map, AutoNavi Map, or another application. The application server corresponding to the first application verifies whether the in-vehicle system can be logged in to with the first user account via which the first application is logged in to, so as to avoid loss of user information in a process of sending the first user account to another server when another server is used. This improves user information security to some extent.

With reference to the first aspect, in a possible implementation of the first aspect, the method further includes: A vehicle receives personalized login data of the first user account from the network side device, and sets the in-vehicle system based on the personalized login data.

The first user account includes personalized login data of a user, for example, autonomous driving data, driving behavior habit data, vehicle seat rearview mirror adjustment data, and the like. After the in-vehicle system is logged in to with the first user account, the in-vehicle system may be set based on the personalized login data, to provide a driving service that conforms to a personal habit for a driver.

With reference to the first aspect, in a possible implementation of the first aspect, the method further includes: The vehicle sends a login success message to the mobile terminal.

That is, after logging in to the in-vehicle system with the first user account, the vehicle sends the login success message to the mobile terminal, so as to prompt the user that the login to the in-vehicle system succeeds.

With reference to the first aspect, in a possible implementation of the first aspect, the login request feedback message or the second verification request message includes at least one of the mobile terminal identifier or the vehicle identifier.

For example, the network side device may know the mobile terminal identifier. For example, after logging in to the first application with the first user account, the mobile terminal reports the mobile terminal identifier to the network side device, and then the network side device determines a correspondence between the first user account and the mobile terminal identifier. The second verification request message, including the mobile terminal identifier, can verify whether the in-vehicle system can be logged in to with the first user account more accurately. This helps improve login security of the in-vehicle system.

For another example, it is assumed that the network side device may know the vehicle identifier. For example, when the vehicle requests the login binding code from the network side device, the vehicle reports the vehicle identifier to the network side device. The second verification request message, including the vehicle identifier, can verify whether the in-vehicle system can be logged in to with the first user account more accurately. This helps improve login security of the in-vehicle system.

With reference to the first aspect, in a possible implementation of the first aspect, after the establishing a near field communication link to a mobile terminal, the method further includes: receiving an in-vehicle system startup request from the mobile terminal based on the near field communication link, where the in-vehicle system startup request is used to start the in-vehicle system.

In this embodiment of this application, the mobile terminal automatically starts the in-vehicle system through the near field communication link, so that operations are convenient.

According to a third aspect, an in-vehicle system login method is further provided, where the method is used to verify, on a network side device, that the in-vehicle system is logged in to with a first user account, and the method includes: verifying, based on a login binding code, the first user account, and an in-vehicle system identifier used to identify the in-vehicle system, that the in-vehicle system can be logged in to with the first user account, where the login binding code is used to verify that a near field communication link is established between a mobile terminal and a vehicle, and the vehicle corresponds to the in-vehicle system; and the login binding code is further used to verify that a user holding the mobile terminal requests to log in to the in-vehicle system with the first user account on the vehicle; and sending a login indication message to the vehicle, where the login indication message is used to indicate to log in to the in-vehicle system with the first user account on the vehicle.

The method provided in the third aspect may be performed by the network side device or an apparatus that may support the network side device in implementing a function of the method. The apparatus is, for example, a chip system.

In this embodiment of this application, the login binding code is determined through negotiation between the mobile terminal and the vehicle through the near field communication link. Therefore, the login binding code may be used to verify that the near field communication link is established between the mobile terminal and the vehicle, and may further be used to verify that the user holding the mobile terminal requests to log in to the in-vehicle system with the first user account on the vehicle. In the method, the user does not need to determine a boarding time, and does not need to log in to the in-vehicle system with the first user account for the first time, so that operations are convenient. In addition, the login binding code is determined through negotiation between the mobile terminal and the vehicle. An association relationship between the vehicle and the mobile terminal can be verified by using the login binding code. This helps improve security of logging in to the in-vehicle system.

Solution 1: The login binding code may be generated by the network side device, for example, the network side device generates the login binding code based on at least one of the first user account, a mobile terminal identifier used to identify the mobile terminal, an in-vehicle system identifier used to identify the in-vehicle system, or a vehicle identifier used to identify the vehicle.

For example, before the verifying, based on a login binding code, the first user account, and an in-vehicle system identifier used to identify the in-vehicle system, that the in-vehicle system can be logged in to with the first user account, the method further includes: receiving a binding code application message from the vehicle or the mobile terminal, where the binding code application message includes at least one of the first user account, a mobile terminal identifier used to identify the mobile terminal, an in-vehicle system identifier used to identify the in-vehicle system, or a vehicle identifier used to identify the vehicle; and generating the login binding code based on the binding code application message, and sending a binding code feedback message to the vehicle or the mobile terminal, where the binding code feedback message includes the login binding code.

In other words, in this embodiment of this application, the network side device generates the login binding code based on at least one of the first user account, the mobile terminal identifier, the in-vehicle system identifier, or the vehicle identifier, and may verify, by using the login binding code, that an association relationship exists between the vehicle and the mobile terminal. This helps improve security of logging in to the in-vehicle system by using a user account on the mobile terminal.

For the foregoing solution 1, there are a plurality of manners in which the network side device verifies, based on a login binding code, the first user account, and an in-vehicle system identifier used to identify the in-vehicle system, that the in-vehicle system can be logged in to with the first user account. For example, the following manner 1 to manner 3 are used.

Manner 1: The network side device receives a first verification request message from the mobile terminal, where the first verification request message includes the login binding code, and the first verification request message further includes at least one of the first user account or the in-vehicle system identifier. The network side device determines that the login binding code in the first verification request message is consistent with the generated login binding code. The network side device determines that the in-vehicle system can be logged in to with the first user account.

For example, the login binding code is generated by the network side device and sent to the vehicle. If the login binding code is received from the mobile terminal, it indicates that an association relationship exists between the mobile terminal and the vehicle. This helps improve security of logging in to the in-vehicle system. In addition, the user does not need to determine a boarding time, and does not need to log in to the in-vehicle system with the first user account for the first time, so that operations are convenient.

Manner 2: The network side device receives a second verification request message from the vehicle, where the second verification request message includes the login binding code, and the second verification request message further includes at least one of the first user account or the in-vehicle system identifier. The network side device determines that the login binding code in the second verification request message is consistent with the generated login binding code. The network side device determines that the in-vehicle system can be logged in to with the first user account.

For example, the login binding code is generated by the network side device and sent to the mobile terminal, and the login binding code is received from the vehicle side. This indicates that an association relationship exists between the mobile terminal and the vehicle, and helps improve security of logging in to the in-vehicle system. In addition, the user does not need to determine a boarding time, and does not need to log in to the in-vehicle system with the first user account for the first time, so that operations are convenient.

Manner 3: The network side device receives a first verification request message from the mobile terminal, where the first verification request message includes the login binding code, and the first verification request message further includes at least one of the first user account or the in-vehicle system identifier. The network side device receives a second verification request message from the vehicle, where the second verification request message includes the login binding code, and the second verification request message further includes at least one of the first user account or the in-vehicle system identifier. The network side device determines that the login binding code in the first verification request message and the login binding code in the second verification request message are consistent with the generated login binding code. The network side device determines that the in-vehicle system can be logged in to with the first user account.

It should be understood that the login binding code is generated by the network side device, and the login binding code is separately received from the vehicle and the mobile terminal. This indicates that an association relationship exists between the mobile terminal and the vehicle, and helps improve security of logging in to the in-vehicle system. In addition, the user does not need to determine a boarding time, and does not need to log in to the in-vehicle system with the first user account for the first time, so that operations are convenient.

Solution 2: The login binding code is generated by the mobile terminal, or is generated by the vehicle, or is generated by both the mobile terminal and the vehicle.

For the foregoing solution 2, a manner in which the network side device verifies, based on a login binding code, the first user account, and an in-vehicle system identifier used to identify the in-vehicle system, that the in-vehicle system can be logged in to with the first user account may be: receiving a first verification request message from the mobile terminal, and receiving a second verification request message from the vehicle, where the first verification request message includes the first user account and the login binding code; and the second verification request message includes the in-vehicle system identifier and the login binding code, or the second verification request message includes the first user account and the login binding code, and the first verification request message includes the in-vehicle system identifier and the login binding code; determining that the login binding code in the first verification request message is consistent with the login binding code in the second verification request message; and determining that the in-vehicle system can be logged in to with the first user account.

It should be understood that the login binding code is generated by the vehicle and/or the mobile terminal. The mobile terminal may send the login binding code to the network side device, or the vehicle may send the login binding code to the network side device. The network side device may better verify, based on the login binding code, that an association relationship exists between the vehicle and the mobile terminal. This helps improve security of logging in to the in-vehicle system.

With reference to the first aspect, in a possible implementation of the first aspect, the first verification request message or the second verification request message further includes at least one of the mobile terminal identifier or the vehicle identifier.

It should be understood that the first verification request message or the second verification request message includes at least one of the mobile terminal identifier or the vehicle identifier, so that security of logging in to the in-vehicle system may be further improved. For example, when the first verification request message includes the mobile terminal identifier, and the network side device knows the mobile terminal identifier, the network side device may verify whether the mobile terminal identifier in the first verification request message is consistent with the known mobile terminal identifier. If the mobile terminal identifier in the first verification request message is consistent with the known mobile terminal identifier, the verification succeeds, and login security is improved.

With reference to the first aspect, in a possible implementation of the first aspect, the method further includes: The network side device sends personalized login data of the first user account to the vehicle, where the personalized login data is used to set the in-vehicle system.

The first user account includes personalized login data of a user, for example, autonomous driving data, driving behavior habit data, vehicle seat rearview mirror adjustment data, and the like. After the in-vehicle system is logged in to with the first user account, the in-vehicle system may be set based on the personalized login data, to provide driving experience that conforms to a personal habit for a driver.

With reference to the first aspect, in a possible implementation of the first aspect, the network side device is an application server of a first application, and the first application is run on the mobile terminal to send a request for logging in to the in-vehicle system with the first user account.

The first application may be any application on the mobile terminal, for example, Baidu Map, AutoNavi Map, or another application. The application server corresponding to the first application verifies whether the in-vehicle system can be logged in to with the first user account via which the first application is logged in to, so as to avoid loss of user information in a process of sending the first user account to another server when another server is used. This improves user information security to some extent.

According to a fourth aspect, an apparatus for logging in to an in-vehicle system is further provided, including: a communication unit, configured to establish a near field communication link to a vehicle, where the vehicle corresponds to the in-vehicle system; and a processing unit, configured to negotiate a login binding code with the vehicle through the near field communication link, where the communication unit is further configured to provide the login binding code to a network side device, and the login binding code is used by the network side device to verify whether the in-vehicle system can be logged in to with the first user account.

The apparatus for logging in to an in-vehicle system provided in the fourth aspect may be the mobile terminal, or an apparatus that may support the mobile terminal in implementing a function of the method, for example, a chip system. For example, the mobile terminal is a mobile phone. The communication unit may include a receiving unit and a sending unit.

Solution 1: The login binding code may be generated by the network side device, for example, the network side device generates the login binding code based on at least one of the first user account, a mobile terminal identifier used to identify the mobile terminal, an in-vehicle system identifier used to identify the in-vehicle system, or a vehicle identifier used to identify the vehicle.

For the foregoing solution 1, there are a plurality of implementations in which the mobile terminal negotiates a login binding code with the vehicle through the near field communication link, for example, the following manner 1 to manner 3.

Manner 1: The communication unit is further configured to: send a first login request message to the vehicle through the near field communication link; and receive, through the near field communication link, a login request feedback message returned by the vehicle, where the login request feedback message includes the login binding code, and the login binding code is requested from the network side device by the vehicle. When the communication unit is configured to provide the login binding code to the network side device, the method specifically includes: sending a first verification request message to the network side device, where the first verification request message includes the login binding code, and the first verification request message further includes at least one of the first user account or the in-vehicle system identifier.

Manner 2: The communication unit is further configured to: send a first binding code application message to the network side device; and receive a first binding code feedback message returned by the network side device, where the first binding code feedback message includes the login binding code. The communication unit is further configured to send a third verification request message to the vehicle through the near field communication link, where the third verification request message includes the login binding code. When the communication unit is configured to provide the login binding code to the network side device, the method specifically includes: indirectly providing the login binding code to the network side device by sending the third verification request message to the vehicle.

Manner 3: The communication unit is further configured to: send a first binding code application message to the network side device; and receive a first binding code feedback message returned by the network side device, where the first binding code feedback message includes the login binding code. The communication unit is further configured to send a second login request message to the vehicle through the near field communication link, where the second login request message includes the login binding code. When the communication unit is configured to provide the login binding code to the network side device, the method specifically includes: sending a first verification request message to the network side device, where the first verification request message includes the login binding code, and the first verification request message further includes at least one of the first user account or the in-vehicle system identifier.

Solution 2: The login binding code is generated by the mobile terminal, or is generated by the vehicle, or is generated by both the mobile terminal and the vehicle.

For the foregoing solution 2, when the communication unit is configured to provide the login binding code to the network side device, the method specifically includes: sending a first verification request message to the network side device, where the first verification request message includes the login binding code, and the first verification request message further includes at least one of the first user account or the in-vehicle system identifier.

With reference to the fourth aspect, in a possible implementation of the fourth aspect, the processing unit is further configured to log in to a first application on the mobile terminal with the first user account, where the network side device is an application server of the first application.

With reference to the fourth aspect, in a possible implementation of the fourth aspect, the communication unit is further configured to receive a verification feedback message sent by the network side device.

With reference to the fourth aspect, in a possible implementation of the fourth aspect, the communication unit is further configured to receive a login success message sent by the vehicle.

With reference to the fourth aspect, in a possible implementation of the fourth aspect, the first verification request message or the second login request message further includes at least one of the mobile terminal identifier or the vehicle identifier.

With reference to the fourth aspect, in a possible implementation of the fourth aspect, after establishing the near field communication link to the vehicle, the communication unit is further configured to send an in-vehicle system startup request to the vehicle based on the near field communication link, where the in-vehicle system startup request is used to start the in-vehicle system.

With reference to the fourth aspect, in a possible implementation of the fourth aspect, the in-vehicle system startup request is sent when a distance between the mobile terminal and the vehicle is less than a first threshold.

According to a fifth aspect, an apparatus for logging in to an in-vehicle system is further provided, including: a communication unit, configured to establish a near field communication link to a mobile terminal, where the mobile terminal is configured to send a request for logging in to the in-vehicle system with a first user account; and a processing unit, configured to negotiate a login binding code with the mobile terminal through the near field communication link. The communication unit is further configured to provide the login binding code to a network side device, where the login binding code is used by the network side device to verify whether the in-vehicle system can be logged in to with the first user account. The communication unit is further configured to receive a login indication message sent by the network side device, where the login indication message is used to indicate to log in to the in-vehicle system with the first user account. The processing unit is further configured to log in to the in-vehicle system with the first user account.

The apparatus for logging in to an in-vehicle system provided in the fifth aspect may be the vehicle, or an apparatus that may support the vehicle in implementing a function of the method, for example, a chip system. The communication unit may include a receiving unit and a sending unit.

Solution 1: The login binding code may be generated by the network side device. For example, the login binding code is generated by the network side device based on at least one of the first user account, a mobile terminal identifier used to identify the mobile terminal, an in-vehicle system identifier used to identify the in-vehicle system, or a vehicle identifier used to identify the vehicle.

For the foregoing solution 1, there are a plurality of implementations in which the vehicle negotiates a login binding code with the mobile terminal through the near field communication link, for example, the following manner 1 to manner 3.

Manner 1: The communication unit is further configured to: receive a first login request message from the mobile terminal through the near field communication link; send a second binding code application message to the network side device; and receive a second binding code feedback message returned by the network side device, where the second binding code feedback message includes the login binding code. The communication unit is further configured to send a login request feedback message to the mobile terminal through the near field communication link, where the login request feedback message includes the login binding code. When the communication unit is configured to provide the login binding code to the network side device, the method specifically includes: indirectly providing the login binding code to the network side device by sending the login request feedback message to the mobile terminal.

Manner 2: The communication unit is further configured to: receive a first login request message from the mobile terminal through the near field communication link; send a second binding code application message to the network side device; and receive a second binding code feedback message returned by the network side device, where the second binding code feedback message includes the login binding code. The communication unit is further configured to send a login request feedback message to the mobile terminal through the near field communication link, where the login request feedback message includes the login binding code. When the communication unit is configured to provide the login binding code to the network side device, the method specifically includes: sending a second verification request message to the network side device, where the second verification request message includes the login binding code, and the second verification request message further includes at least one of the first user account or the in-vehicle system identifier.

Manner 3: The communication unit is further configured to receive a third verification request message or a second login request message from the mobile terminal through the near field communication link, where the third verification request message or the second login request message includes the login binding code, and the login binding code is requested from the network side device by the mobile terminal. When the communication unit is configured to provide the login binding code to the network side device, the method specifically includes: sending a second verification request message to the network side device, where the second verification request message includes the login binding code.

Solution 2: The login binding code is generated by the mobile terminal, or is generated by the vehicle, or is generated by both the mobile terminal and the vehicle.

For the foregoing solution 2, when the communication unit is configured to provide the login binding code to the network side device, the method specifically includes: sending a second verification request message to the network side device, where the second verification request message includes the login binding code, and the second verification request message further includes at least one of the first user account or the in-vehicle system identifier.

With reference to the fifth aspect, in a possible implementation of the fifth aspect, the network side device is an application server of a first application, and the first application is run on the mobile terminal to send a request for logging in to the in-vehicle system with the first user account.

With reference to the fifth aspect, in a possible implementation of the fifth aspect, the method further includes: receiving personalized login data of the first user account from the network side device, and setting the in-vehicle system based on the personalized login data.

With reference to the fifth aspect, in a possible implementation of the fifth aspect, the method further includes: sending a login success message to the mobile terminal.

With reference to the fifth aspect, in a possible implementation of the fifth aspect, the login request feedback message or the second verification request message includes at least one of the mobile terminal identifier or the vehicle identifier.

With reference to the fifth aspect, in a possible implementation of the fifth aspect, after establishing the near field communication link to the mobile terminal, the method further includes: receiving an in-vehicle system startup request from the mobile terminal based on the near field communication link, where the in-vehicle system startup request is used to start the in-vehicle system.

According to a sixth aspect, an apparatus for logging in to an in-vehicle system is further provided, including: a processing unit, configured to verify, based on a login binding code, the first user account, and an in-vehicle system identifier used to identify the in-vehicle system, that the in-vehicle system can be logged in to with the first user account, where the login binding code is used to verify that a near field communication link is established between a mobile terminal and a vehicle, and the vehicle corresponds to the in-vehicle system. The login binding code is further used to verify that a user holding the mobile terminal requests to log in to the in-vehicle system with the first user account on the vehicle. The communication unit is configured to send a login indication message to the vehicle, where the login indication message is used to indicate to log in to the in-vehicle system with the first user account on the vehicle.

The apparatus for logging in to an in-vehicle system provided in the sixth aspect may be the network side device, or an apparatus that may support the network side device in implementing a function of the method, for example, a chip system. The communication unit may include a receiving unit and a sending unit.

Solution 1: The login binding code may be generated by the network side device, for example, the network side device generates the login binding code based on at least one of the first user account, a mobile terminal identifier used to identify the mobile terminal, an in-vehicle system identifier used to identify the in-vehicle system, or a vehicle identifier used to identify the vehicle.

For example, the communication unit receives a binding code application message from the vehicle or the mobile terminal, where the binding code application message includes at least one of the first user account, the mobile terminal identifier used to identify the mobile terminal, the in-vehicle system identifier used to identify the in-vehicle system, or the vehicle identifier used to identify the vehicle. The processing unit is specifically configured to generate the login binding code based on the binding code application message. The communication unit is further configured to send a binding code feedback message to the vehicle or the mobile terminal, where the binding code feedback message includes the login binding code.

For the foregoing solution 1, there may be a plurality of manners in which the network side device verifies, based on a login binding code, the first user account, and an in-vehicle system identifier used to identify the in-vehicle system, that the in-vehicle system can be logged in to with the first user account. For example, the following manner 1 to manner 3 are used.

Manner 1: The communication unit of the network side device is configured to receive a first verification request message from the mobile terminal, where the first verification request message includes the login binding code, and the first verification request message further includes at least one of the first user account or the in-vehicle system identifier. The processing unit is configured to determine that the login binding code in the first verification request message is consistent with the generated login binding code. The processing unit is further configured to determine that the in-vehicle system can be logged in to with the first user account.

Manner 2: The communication unit is configured to receive a second verification request message from the vehicle, where the second verification request message includes the login binding code, and the second verification request message further includes at least one of the first user account or the in-vehicle system identifier. The processing unit is configured to determine that the login binding code in the second verification request message is consistent with the generated login binding code. The processing unit is further configured to determine that the in-vehicle system can be logged in to with the first user account.

Manner 3: The communication unit is configured to receive a first verification request message from the mobile terminal, where the first verification request message includes the login binding code, and the first verification request message further includes at least one of the first user account or the in-vehicle system identifier. The communication unit is further configured to receive a second verification request message from the vehicle, where the second verification request message includes the login binding code, and the second verification request message further includes at least one of the first user account or the in-vehicle system identifier. The processing unit is specifically configured to determine that the login binding code in the first verification request message and the login binding code in the second verification request message are consistent with the generated login binding code. The processing unit is further configured to determine that the in-vehicle system can be logged in to with the first user account.

Solution 2: The login binding code is generated by the mobile terminal, or is generated by the vehicle, or is generated by both the mobile terminal and the vehicle.

For the foregoing solution 2, when the processing unit is configured to verify, based on the login binding code, the first user account, and the in-vehicle system identifier used to identify the in-vehicle system, that the in-vehicle system can be logged in to with the first user account, the method specifically includes: The communication unit is configured to receive a first verification request message from the mobile terminal, and receive a second verification request message from the vehicle, where the first verification request message includes the first user account and the login binding code; and the second verification request message includes the in-vehicle system identifier and the login binding code. Alternatively, the second verification request message includes the first user account and the login binding code, and the first verification request message includes the in-vehicle system identifier and the login binding code. The processing unit is specifically configured to determine that the login binding code in the first verification request message is consistent with the login binding code in the second verification request message. The processing unit is further configured to determine that the in-vehicle system can be logged in to with the first user account.

With reference to the sixth aspect, in a possible implementation of the sixth aspect, the first verification request message or the second verification request message further includes at least one of the mobile terminal identifier or the vehicle identifier.

With reference to the sixth aspect, in a possible implementation of the sixth aspect, the method further includes: sending personalized login data of the first user account to the vehicle, where the personalized login data is used to set the in-vehicle system.

With reference to the sixth aspect, in a possible implementation of the sixth aspect, the network side device is an application server of a first application, and the first application is run on the mobile terminal to send a request for logging in to the in-vehicle system with the first user account.

According to a seventh aspect, an apparatus for logging in to an in-vehicle system is further provided, including: a transceiver, configured to establish a near field communication link to a vehicle, where the vehicle corresponds to the in-vehicle system; and a processor, configured to negotiate a login binding code with the vehicle through the near field communication link, where the transceiver is further configured to provide the login binding code to a network side device, and the login binding code is used by the network side device to verify whether the in-vehicle system can be logged in to with the first user account.

The apparatus for logging in to an in-vehicle system provided in the seventh aspect may be the mobile terminal, or an apparatus that may support the mobile terminal in implementing a function of the method, for example, a chip system. For example, the mobile terminal is a mobile phone. The communication unit may include a receiving unit and a sending unit.

Solution 1: The login binding code may be generated by the network side device, for example, the network side device generates the login binding code based on at least one of the first user account, a mobile terminal identifier used to identify the mobile terminal, an in-vehicle system identifier used to identify the in-vehicle system, or a vehicle identifier used to identify the vehicle.

For the foregoing solution 1, there are a plurality of manners in which the mobile terminal negotiates a login binding code with the vehicle through the near field communication link, for example, the following manner 1 to manner 3.

Manner 1: The transceiver is further configured to send a first login request message to the vehicle through the near field communication link. The transceiver is further configured to receive, through the near field communication link, a login request feedback message returned by the vehicle, where the login request feedback message includes the login binding code, and the login binding code is requested from the network side device by the vehicle. When the transceiver is configured to provide the login binding code to the network side device, the method specifically includes: sending a first verification request message to the network side device, where the first verification request message includes the login binding code, and the first verification request message further includes at least one of the first user account or the in-vehicle system identifier.

Manner 2: The transceiver is further configured to: send a first binding code application message to the network side device; and receive a first binding code feedback message returned by the network side device, where the first binding code feedback message includes the login binding code. The transceiver is further configured to send a third verification request message to the vehicle through the near field communication link, where the third verification request message includes the login binding code. When the transceiver is configured to provide the login binding code to the network side device, the method specifically includes: indirectly providing the login binding code to the network side device by sending the third verification request message to the vehicle.

Manner 3: The transceiver is further configured to: send a first binding code application message to the network side device; and receive a first binding code feedback message returned by the network side device, where the first binding code feedback message includes the login binding code. The transceiver is further configured to send a second login request message to the vehicle through the near field communication link, where the second login request message includes the login binding code. When the transceiver is configured to provide the login binding code to the network side device, the method specifically includes: sending a first verification request message to the network side device, where the first verification request message includes the login binding code, and the first verification request message further includes at least one of the first user account or the in-vehicle system identifier.

Solution 2: The login binding code is generated by the mobile terminal, or is generated by the vehicle, or is generated by both the mobile terminal and the vehicle.

For the foregoing solution 2, when the transceiver is configured to provide the login binding code to the network side device, the method specifically includes: sending a first verification request message to the network side device, where the first verification request message includes the login binding code, and the first verification request message further includes at least one of the first user account or the in-vehicle system identifier.

With reference to the seventh aspect, in a possible implementation of the seventh aspect, the processing unit is further configured to log in to a first application on the mobile terminal with the first user account, where the network side device is an application server of the first application.

With reference to the seventh aspect, in a possible implementation of the seventh aspect, the communication unit is further configured to receive a verification feedback message sent by the network side device.

With reference to the seventh aspect, in a possible implementation of the seventh aspect, the communication unit is further configured to receive a login success message sent by the vehicle.

With reference to the seventh aspect, in a possible implementation of the seventh aspect, the first verification request message or the second login request message further includes at least one of the mobile terminal identifier or the vehicle identifier.

With reference to the seventh aspect, in a possible implementation of the seventh aspect, after establishing the near field communication link to the vehicle, the communication unit is further configured to send an in-vehicle system startup request to the vehicle based on the near field communication link, where the in-vehicle system startup request is used to start the in-vehicle system.

With reference to the seventh aspect, in a possible implementation of the seventh aspect, the in-vehicle system startup request is sent when a distance between the mobile terminal and the vehicle is less than a first threshold.

According to an eighth aspect, an apparatus for logging in to an in-vehicle system is further provided, including: a transceiver, configured to establish a near field communication link to a mobile terminal, where the mobile terminal is configured to send a request for logging in to the in-vehicle system with a first user account; and a processor, configured to negotiate a login binding code with the mobile terminal through the near field communication link. The transceiver is further configured to provide the login binding code to a network side device, where the login binding code is used by the network side device to verify whether the in-vehicle system can be logged in to with the first user account. The transceiver is further configured to receive a login indication message sent by the network side device, where the login indication message is used to indicate to log in to the in-vehicle system with the first user account. The processor is further configured to log in to the in-vehicle system with the first user account.

The apparatus for logging in to an in-vehicle system provided in the eighth aspect may be the vehicle, or an apparatus that may support the vehicle in implementing a function of the method, for example, a chip system. The communication unit may include a receiving unit and a sending unit.

Solution 1: The login binding code may be generated by the network side device. For example, the login binding code is generated by the network side device based on at least one of the first user account, a mobile terminal identifier used to identify the mobile terminal, an in-vehicle system identifier used to identify the in-vehicle system, or a vehicle identifier used to identify the vehicle.

For the foregoing solution 1, there are a plurality of implementations in which the vehicle negotiates a login binding code with the mobile terminal through the near field communication link, for example, the following manner 1 to manner 3.

Manner 1: The transceiver is further configured to: receive a first login request message from the mobile terminal through the near field communication link; send a second binding code application message to the network side device; and receive a second binding code feedback message returned by the network side device, where the second binding code feedback message includes the login binding code. The transceiver is further configured to send a login request feedback message to the mobile terminal through the near field communication link, where the login request feedback message includes the login binding code. When the transceiver is configured to provide the login binding code to the network side device, the method specifically includes: indirectly providing the login binding code to the network side device by sending the login request feedback message to the mobile terminal.

Manner 2: The transceiver is further configured to: receive a first login request message from the mobile terminal through the near field communication link; send a second binding code application message to the network side device; and receive a second binding code feedback message returned by the network side device, where the second binding code feedback message includes the login binding code. The transceiver is further configured to send a login request feedback message to the mobile terminal through the near field communication link, where the login request feedback message includes the login binding code. When the transceiver is configured to provide the login binding code to the network side device, the method specifically includes: sending a second verification request message to the network side device, where the second verification request message includes the login binding code, and the second verification request message further includes at least one of the first user account or the in-vehicle system identifier.

Manner 3: The transceiver is further configured to receive a third verification request message or a second login request message from the mobile terminal through the near field communication link, where the third verification request message or the second login request message includes the login binding code, and the login binding code is requested from the network side device by the mobile terminal. When the transceiver is configured to provide the login binding code to the network side device, the method specifically includes: sending a second verification request message to the network side device, where the second verification request message includes the login binding code.

Solution 2: The login binding code is generated by the mobile terminal, or is generated by the vehicle, or is generated by both the mobile terminal and the vehicle.

For the foregoing solution 2, when the transceiver is configured to provide the login binding code to the network side device, the method specifically includes: sending a second verification request message to the network side device, where the second verification request message includes the login binding code, and the second verification request message further includes at least one of the first user account or the in-vehicle system identifier.

With reference to the eighth aspect, in a possible implementation of the eighth aspect, the network side device is an application server of a first application, and the first application is run on the mobile terminal to send a request for logging in to the in-vehicle system with the first user account.

With reference to the eighth aspect, in a possible implementation of the eighth aspect, the method further includes: receiving personalized login data of the first user account from the network side device, and setting the in-vehicle system based on the personalized login data.

With reference to the eighth aspect, in a possible implementation of the eighth aspect, the method further includes: sending a login success message to the mobile terminal.

With reference to the eighth aspect, in a possible implementation of the eighth aspect, the login request feedback message or the second verification request message includes at least one of the mobile terminal identifier or the vehicle identifier.

With reference to the eighth aspect, in a possible implementation of the eighth aspect, after establishing the near field communication link to the mobile terminal, the method further includes: receiving an in-vehicle system startup request from the mobile terminal based on the near field communication link, where the in-vehicle system startup request is used to start the in-vehicle system.

According to a ninth aspect, an apparatus for logging in to an in-vehicle system is further provided, including a processor, configured to verify, based on a login binding code, a first user account, and an in-vehicle system identifier used to identify the in-vehicle system, that the in-vehicle system can be logged in to with the first user account, where the login binding code is used to verify that a near field communication link is established between a mobile terminal and a vehicle, and the vehicle corresponds to the in-vehicle system. The login binding code is further used to verify that a user holding the mobile terminal requests to log in to the in-vehicle system with the first user account on the vehicle. The transceiver is configured to send a login indication message to the vehicle, where the login indication message is used to indicate to log in to the in-vehicle system with the first user account on the vehicle.

The apparatus for logging in to an in-vehicle system provided in the ninth aspect may be the network side device, or an apparatus that may support the network side device in implementing a function of the method, for example, a chip system. The communication unit may include a receiving unit and a sending unit.

Solution 1: The login binding code may be generated by the network side device, for example, the network side device generates the login binding code based on at least one of the first user account, a mobile terminal identifier used to identify the mobile terminal, an in-vehicle system identifier used to identify the in-vehicle system, or a vehicle identifier used to identify the vehicle.

For example, the transceiver receives a binding code application message from the vehicle or the mobile terminal, where the binding code application message includes at least one of the first user account, the mobile terminal identifier used to identify the mobile terminal, the in-vehicle system identifier used to identify the in-vehicle system, or the vehicle identifier used to identify the vehicle. The processor is specifically configured to generate the login binding code based on the binding code application message. The transceiver is further configured to send a binding code feedback message to the vehicle or the mobile terminal, where the binding code feedback message includes the login binding code.

For the foregoing solution 1, there may be a plurality of manners in which the network side device verifies, based on a login binding code, the first user account, and an in-vehicle system identifier used to identify the in-vehicle system, that the in-vehicle system can be logged in to with the first user account. For example, the following manner 1 to manner 3 are used.

Manner 1: The transceiver of the network side device is configured to receive a first verification request message from the mobile terminal, where the first verification request message includes the login binding code, and the first verification request message further includes at least one of the first user account or the in-vehicle system identifier. The processor is configured to determine that the login binding code in the first verification request message is consistent with the generated login binding code. The processor is further configured to determine that the in-vehicle system can be logged in to with the first user account.

Manner 2: The transceiver is configured to receive a second verification request message from the vehicle, where the second verification request message includes the login binding code, and the second verification request message further includes at least one of the first user account or the in-vehicle system identifier. The processor is configured to determine that the login binding code in the second verification request message is consistent with the generated login binding code. The processor is further configured to determine that the in-vehicle system can be logged in to with the first user account.

Manner 3: The transceiver is configured to receive a first verification request message from the mobile terminal, where the first verification request message includes the login binding code, and the first verification request message further includes at least one of the first user account or the in-vehicle system identifier. The transceiver is further configured to receive a second verification request message from the vehicle, where the second verification request message includes the login binding code, and the second verification request message further includes at least one of the first user account or the in-vehicle system identifier. The processor is configured to determine that the login binding code in the first verification request message and the login binding code in the second verification request message are consistent with the generated login binding code. The processor is further configured to determine that the in-vehicle system can be logged in to with the first user account.

Solution 2: The login binding code is generated by the mobile terminal, or is generated by the vehicle, or is generated by both the mobile terminal and the vehicle.

For the foregoing solution 2, when the processor is configured to verify, based on the login binding code, the first user account, and the in-vehicle system identifier used to identify the in-vehicle system, that the in-vehicle system can be logged in to with the first user account, the method specifically includes: The transceiver is configured to receive a first verification request message from the mobile terminal, and receive a second verification request message from the vehicle, where the first verification request message includes the first user account and the login binding code, and the second verification request message includes the in-vehicle system identifier and the login binding code. Alternatively, the second verification request message includes the first user account and the login binding code, and the first verification request message includes the in-vehicle system identifier and the login binding code. The processor is specifically configured to determine that the login binding code in the first verification request message is consistent with the login binding code in the second verification request message. The processing unit is further configured to determine that the in-vehicle system can be logged in to with the first user account.

With reference to the ninth aspect, in a possible implementation of the ninth aspect, the first verification request message or the second verification request message further includes at least one of the mobile terminal identifier or the vehicle identifier.

With reference to the ninth aspect, in a possible implementation of the ninth aspect, the method further includes: sending personalized login data of the first user account to the vehicle, where the personalized login data is used to set the in-vehicle system.

With reference to the ninth aspect, in a possible implementation of the ninth aspect, the network side device is an application server of a first application, and the first application is run on the mobile terminal to send a request for logging in to the in-vehicle system with the first user account.

According to a tenth aspect, an apparatus for logging in to an in-vehicle system is further provided, including a processor and a memory. The memory stores program instructions. When the program instructions are executed, the apparatus for logging in to an in-vehicle system performs the method provided in the first aspect. The apparatus for logging in to an in-vehicle system may be the mobile terminal or an apparatus that may support the mobile terminal in implementing a function of the method provided in the first aspect, for example, a chip system.

According to an eleventh aspect, an apparatus for logging in to an in-vehicle system is further provided, including a processor and a memory. The memory stores program instructions. When the program instructions are executed, the apparatus for logging in to an in-vehicle system performs the method provided in the second aspect. The apparatus for logging in to an in-vehicle system may be the vehicle or an apparatus that may support the vehicle in implementing a function of the method provided in the second aspect, for example, a chip system.

According to a twelfth aspect, an apparatus for logging in to an in-vehicle system is further provided, including a processor and a memory. The memory stores program instructions. When the program instructions are executed, the apparatus for logging in to an in-vehicle system performs the method provided in the third aspect. The apparatus for logging in to an in-vehicle system may be the network side device or an apparatus that may support the network side device in implementing a function of the method provided in the third aspect, for example, a chip system.

According to a thirteenth aspect, a system for logging in to an in-vehicle system is further provided, including the apparatus for logging in to an in-vehicle system provided in the fourth aspect or the seventh aspect, the apparatus for logging in to an in-vehicle system provided in the fifth aspect or the eighth aspect, and the apparatus for logging in to an in-vehicle system provided in the sixth aspect or the ninth aspect.

According to a fourteenth aspect, a computer-readable storage medium is further provided. The computer-readable storage medium includes a computer program. When the computer program is run on a processor, an apparatus for logging in to an in-vehicle system is enabled to perform the method provided in the first aspect.

According to a fifteenth aspect, a computer-readable storage medium is further provided. The computer-readable storage medium includes a computer program. When the computer program is run on a processor, an apparatus for logging in to an in-vehicle system is enabled to perform the method provided in the second aspect.

According to a sixteenth aspect, a computer-readable storage medium is further provided. The computer-readable storage medium includes a computer program. When the computer program is run on a processor, an apparatus for logging in to an in-vehicle system is enabled to perform the method provided in the third aspect.

According to a seventeenth aspect, a computer program product is further provided. When the computer program product is run on a processor, an apparatus for logging in to an in-vehicle system is enabled to perform the method provided in the first aspect.

According to an eighteenth aspect, a computer program product is further provided. When the computer program product is run on a processor, an apparatus for logging in to an in-vehicle system is enabled to perform the method provided in the second aspect.

According to a nineteenth aspect, a computer program product is further provided. When the computer program product is run on a processor, an apparatus for logging in to an in-vehicle system is enabled to perform the method provided in the third aspect.

For beneficial effects of the fourth aspect to the nineteenth aspect, refer to the beneficial effects of the first aspect to the third aspect. Details are not described herein again.

DESCRIPTION OF EMBODIMENTS

Figure 1:
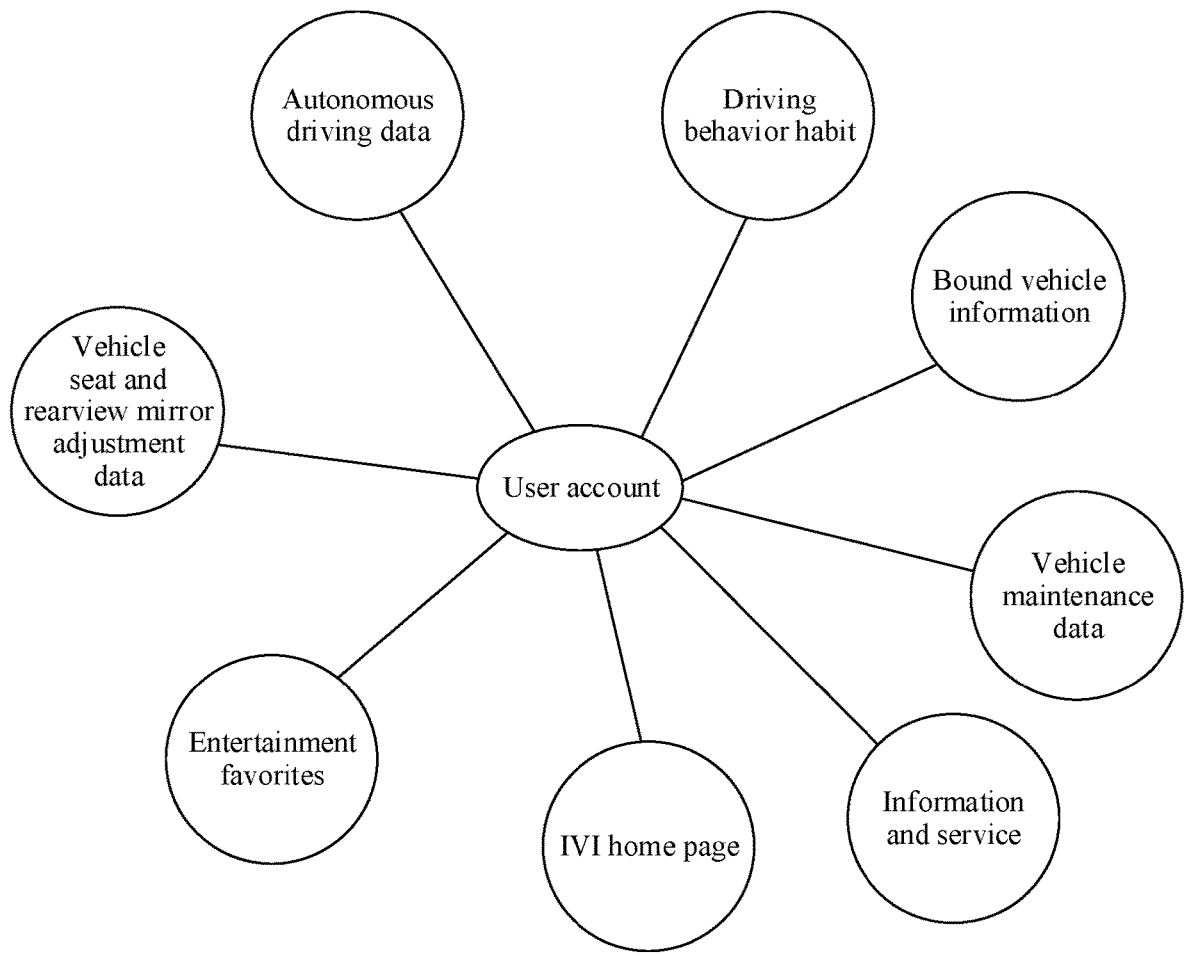
FIG. 1 is a schematic diagram of a user account and personalized data included in the user account according to an embodiment of this application.
Figure 2:
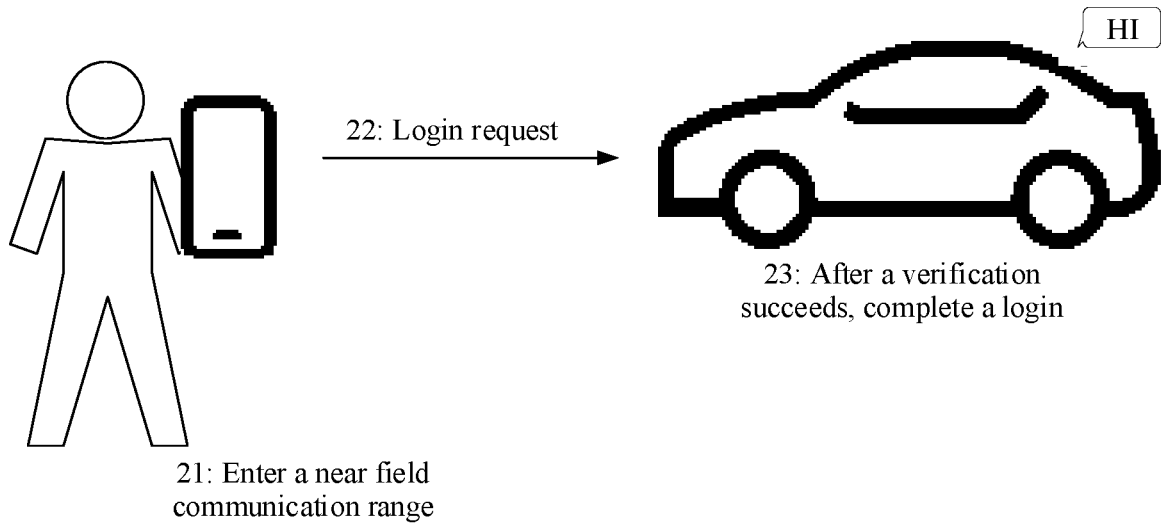
FIG. 2 is a schematic diagram of a process of logging in to an in-vehicle system in the conventional technology.
Figure 3:
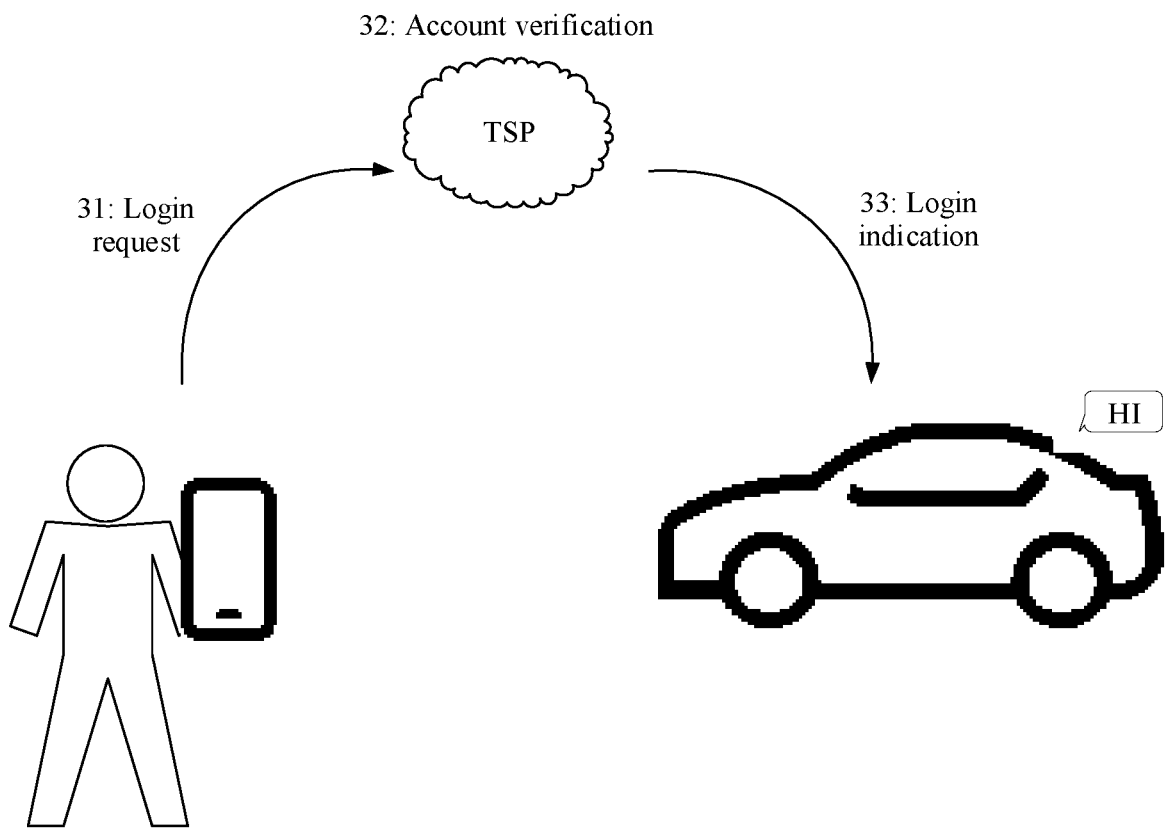
FIG. 3 is a schematic diagram of another process of logging in to an in-vehicle system in the conventional technology.

For ease of understanding, terms in embodiments of this application are explained and described, and the explanations and descriptions of the terms are also used as a part of application content of embodiments of this application.

1) A mobile terminal in embodiments of this application is a device such as a mobile phone, a tablet computer, a wearable device (such as glasses, gloves, a watch, a band, clothing, or shoes), an in-vehicle device (or referred to as an in-vehicle terminal), an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA), and a specific type of the mobile terminal is not limited in embodiments of this application. Alternatively, the mobile terminal may further include a relay (relay).

It should be noted that, in embodiments of this application, the mobile terminal may be any device that has a near field communication link function (for example, a Bluetooth function) and that can establish a connection to a network side device. Details are not described herein.

In embodiments of this application, an apparatus configured to implement a function of the mobile terminal may be the mobile terminal, or may be an apparatus that may support the terminal in implementing the function, for example, a chip system. The apparatus may be installed on the mobile terminal. In embodiments of this application, the chip system may include a chip, or may include a chip and another discrete component. The following uses an example in which an apparatus for implementing a function of a mobile terminal is a mobile terminal.

2) An application (application, app for short) in embodiments of this application is referred to an app and is a software program that can implement one or more specific functions. Generally, one or more applications may be installed on the mobile terminal, for example, an instant messaging application, a video application, an audio application, and an image shooting application. The instant messaging application may include, for example, Messages, WeChat (WeChat), WhatsApp Messenger, Line (Line), Image sharing (Instagram), Kakao Talk, and DingTalk. The image shooting application may include, for example, a camera application (a system camera or a third-party camera application). The video application may include, for example, Youtube, Twitter, TikTok, iQIYI, and Tencent Video. The audio application may include, for example, Google Music, KuGou, EMUMO, and QQ Music.

3) The network side device in embodiments of this application may include a server. For example, a first application is installed on the mobile terminal, and the network side device may be an application server corresponding to the first application. The first application herein may be an application related to a vehicle. For example, if the first application is Baidu Map, the server is a server corresponding to Baidu Map.

In embodiments of this application, an apparatus configured to implement a function of the network side device may be the network side device, or may be an apparatus that may support the network side device in implementing the function, for example, a chip system. The apparatus may be installed in the network side device. The following uses an example in which an apparatus for implementing a function of a network side device is a network side device.

4) A vehicle identifier, an in-vehicle system identifier, and a mobile terminal identifier in embodiments of this application. The vehicle identifier is an identifier used to identify a vehicle, and may be understood as an identifier of vehicle hardware, for example, a vehicle ID. The in-vehicle system identifier is an identifier used to identify an in-vehicle system (which may be understood as a software client in the vehicle), and may be understood as a software identifier in the vehicle, for example, a serial number (serial number, SN) of the vehicle. The mobile terminal identifier is an identifier used to identify the mobile terminal, for example, a model or a serial number of the mobile terminal.

5) Terms "system" and "network" may be used interchangeably in embodiments of this application. "A plurality of" means two or more. In view of this, "a plurality of" may also be understood as "at least two" in embodiments of this application. "At least one" may be understood as one or more, for example, one, two, or more. For example, "including at least one" means including one, two, or more, and does not limit which items are included. For example, if at least one of A, B, and C is included, A, B, C, A and B, A and C, B and C, or A, B, and C may be included. Similarly, understanding of description such as "at least one type" is similar. The term "and/or" describes an association relationship for describing associated objects and represents that three relationships may exist. For example, A and/or B may represent the following three cases: Only A exists, both A and B exist, and only B exists. In addition, the character "I" generally indicates an "or" relationship between the associated objects.

Unless otherwise specified, ordinal numbers such as "first" and "second" in embodiments of this application are used to distinguish between a plurality of objects, and are not intended to limit a sequence, a time sequence, priorities, or importance of the plurality of objects.

The following describes a communication system provided in an embodiment of this application.

Figure 4:
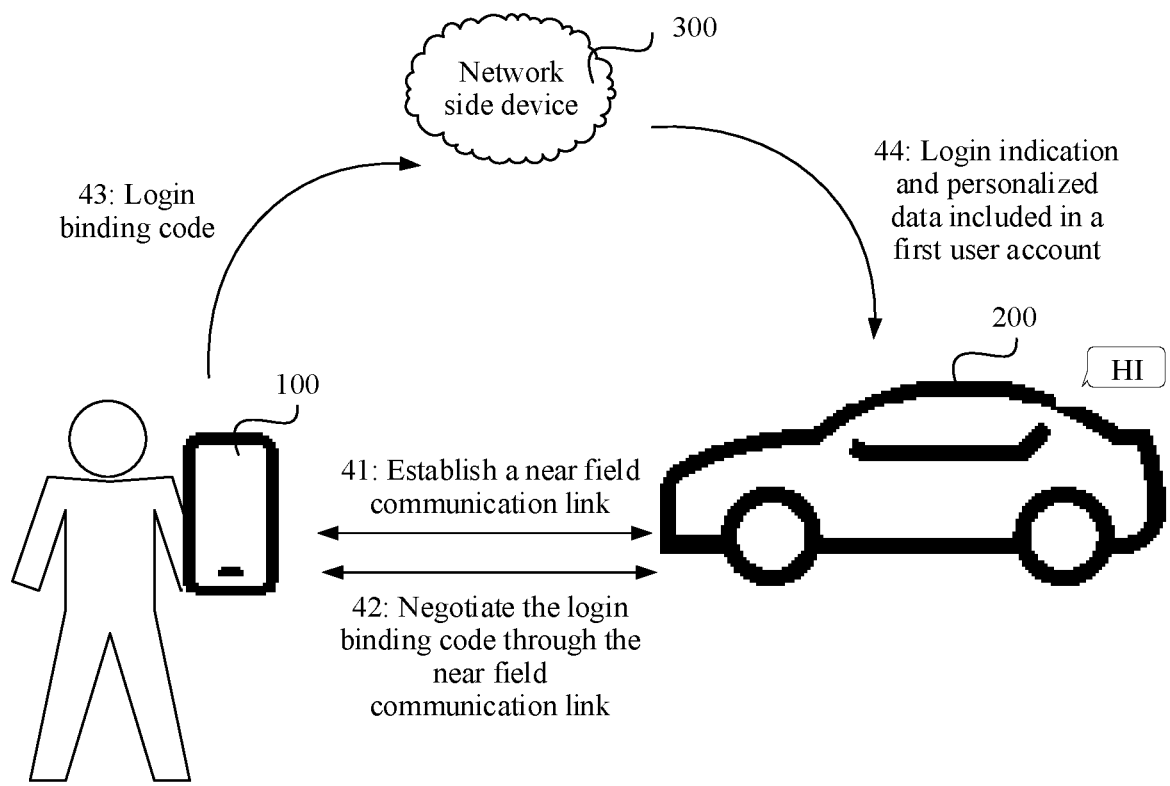
FIG. 4 is a schematic flowchart of a first method for logging in to an in-vehicle system according to an embodiment of this application.

FIG. 4 is a schematic diagram of a communication system according to an embodiment of this application. As shown in FIG. 4, the communication system includes a mobile terminal 100, a vehicle 200, and a network side device 300. For example, the mobile terminal 100 is a mobile phone. A first application on the mobile terminal 100 is logged in to with a first user account. The network side device 300 may be an application server corresponding to the first application. When the user carries the mobile terminal 100 and approaches the vehicle 200, the mobile terminal 100 establishes a near field communication connection, for example, a Bluetooth connection, to the vehicle 200. The mobile terminal 100 requests, through the near field communication link, to log in to an in-vehicle system of the vehicle 200 with the first user account. The mobile terminal 100 negotiates a login binding code with the vehicle 200 through the near field communication link, and provides the login binding code to the network side device 300. The login binding code is used by the network side device to verify whether the in-vehicle system can be logged in to with the first user account. When the network side device 300 verifies that the in-vehicle system can be logged in to with the first user account, the network side device 300 sends a login indication and personalized data corresponding to the first user account to the vehicle 200. The in-vehicle system of the vehicle 200 is logged in to with the first user account.

Therefore, in this embodiment of this application, the vehicle 200 does not need to locally store a user account, that is, the in-vehicle system of the vehicle 200 does not need to be pre-logged in to with the first user account. In other words, in the technical solution provided in this embodiment of this application, automatic login may also be implemented when the in-vehicle system of the vehicle 200 is logged in to for the first time. In addition, in this embodiment of this application, the user does not need to determine a boarding time. When the user carriers the mobile terminal 100 and approaches the in-vehicle system 200, the user can automatically log in to the in-vehicle system 200. This facilitates an operation and improves user experience.

It should be understood that FIG. 4 is merely an example of a communication system. The solution of this application may be further applicable to another system, for example, a communication system that includes a mobile terminal, a network side device, and an airplane/unmanned aerial vehicle and that is used to log in to an aircraft.

Figure 5:
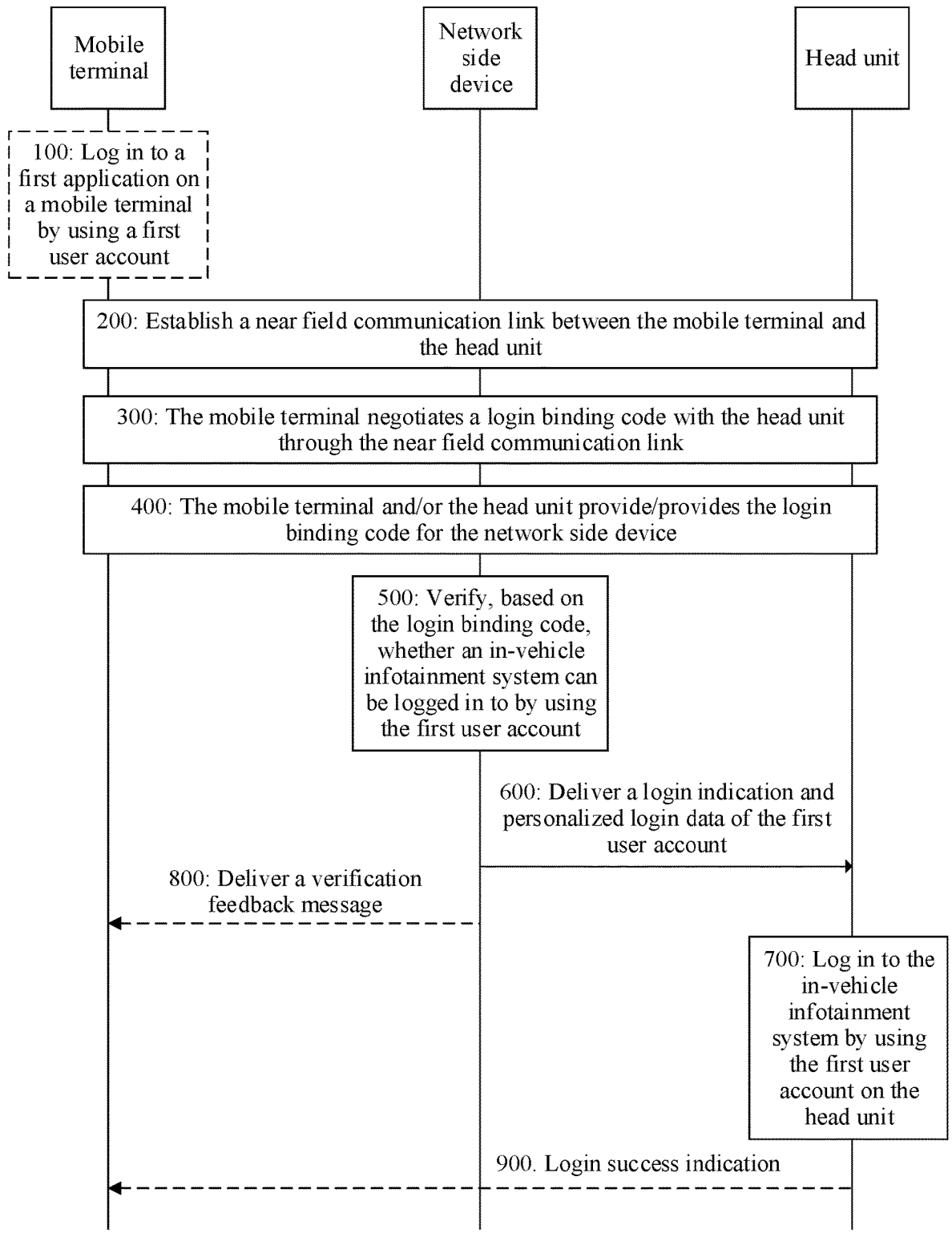
FIG. 5 is a schematic flowchart of a second method for logging in to an in-vehicle system according to an embodiment of this application.

FIG. 5 is a schematic flowchart of a method for logging in to an in-vehicle system according to an embodiment of this application. The procedure may be applicable to the communication system shown in FIG. 4. As shown in FIG. 5, the procedure of the method includes the following steps.

Step 100: Log in to a first application on a mobile terminal with a first user account.

For example, the first application is, for example, Auto-Navi Map, Baidu Map, or another application related to a vehicle. This is not limited in this embodiment of this application.

Step 200: The mobile terminal establishes a near field communication link to the vehicle. The near field communication connection is, for example, a Bluetooth connection or another short-range connection.

The Bluetooth connection is used as an example. A process in which the mobile terminal establishes the Bluetooth connection to the vehicle may include Bluetooth pairing, connection, and the like. Details are not described herein.

In some embodiments, to prevent a plurality of mobile terminals from establishing Bluetooth connections to the vehicle, the vehicle may determine a mobile terminal that requests to establish a Bluetooth connection. If the vehicle locally stores a terminal identifier of the mobile terminal, the vehicle agrees to establish a Bluetooth connection to the mobile terminal. If the vehicle does not locally store a terminal identifier of the mobile terminal, the vehicle refuses to establish a Bluetooth connection to the mobile terminal.

For example, after the vehicle establishes a Bluetooth connection to a mobile terminal (for example, establishes a Bluetooth connection for the first time), the vehicle locally stores a device identifier of the mobile terminal. When the mobile terminal approaches the vehicle, the vehicle may find the device identifier of the mobile terminal, and establish the Bluetooth connection to the mobile terminal when it is compared that the device identifier is consistent with the stored device identifier. When it is compared that the device identifier is inconsistent with the stored device identifier, the vehicle may refuse to establish the Bluetooth connection to the mobile terminal. Therefore, any mobile terminal may be prevented from establishing a Bluetooth connection to the vehicle. This improves security.

Alternatively, when finding an identifier of a vehicle, a mobile terminal may determine whether the identifier of the vehicle is consistent with a locally stored vehicle identifier, to prevent the mobile terminal from establishing Bluetooth connections to a plurality of vehicles. If the identifier of the vehicle is consistent with the locally stored vehicle identifier, the mobile terminal initiates a Bluetooth connection to a vehicle corresponding to the vehicle identifier. Otherwise, the mobile terminal does not establish a Bluetooth connection to a vehicle corresponding to the vehicle identifier. Therefore, the mobile terminal may be prevented from establishing a Bluetooth connection to any vehicle. This improves security.

Optionally, when determining that a distance between the mobile terminal and the vehicle is less than a second threshold, the mobile terminal may accurately establish a near field communication link to the vehicle.

Optionally, after step 200, the vehicle may be automatically powered on. Alternatively, after step 200, the mobile terminal sends a power-on request to the vehicle, to request the in-vehicle system to be powered on. After receiving the power-on request, the vehicle completes power-on of the in-vehicle system. The mobile terminal may send the power-on request when determining that a distance between the mobile terminal and the in-vehicle system is less than a first threshold. Optionally, the first threshold may be less than the second threshold. A specific value is not limited in this embodiment of this application. That is, in a process in which the mobile terminal detects that the distance between the mobile terminal and the in-vehicle system gradually decreases, the mobile terminal first establishes a near field communication connection to the vehicle, and then triggers power-on of the in-vehicle system.

Step 300: The mobile terminal negotiates a login binding code with the vehicle through the near field communication link.

There may be a plurality of implementations in which the mobile terminal negotiates the login binding code with the vehicle through the near field communication link. For example, the login binding code is generated by a network side device. For example, the mobile terminal applies to the network side device for a login binding code, and sends the login binding code to the vehicle; or the vehicle applies to the network side device for a login binding code, and sends the login binding code to the mobile terminal. For another example, the login binding code is generated by the mobile terminal and sent to the vehicle; or the login binding code is generated by the vehicle and sent to the mobile terminal; or the login binding code is generated by both the mobile terminal and the vehicle.

Step 400: The mobile terminal and/or the vehicle provide/provides the login binding code to the network side device, where the login binding code is used by the network side device to verify whether the in-vehicle system can be logged in to with the first user account.

Step 500: The network side device verifies, based on the login binding code, whether the in-vehicle system can be logged in to with the first user account, determines that the in-vehicle system can be logged in to with the first user account and performs a subsequent step when the verification succeeds; otherwise, the network side device stops performing a subsequent step, or may further send a verification failure indication to the vehicle or the mobile terminal.

It should be noted that step 300 has a plurality of implementations, and step 400 and step 500 are related to step 300. Therefore, step 400 and step 500 also correspondingly have a plurality of implementations, which are separately described in the following.

Step 600: The network side device sends a login indication and personalized data of the first user account to the vehicle.

For example, the login indication herein may be, for example, a token. For the personalized data of the first user account, refer to FIG. 1, and details are not described herein again.

Step 700: Log in to the in-vehicle system with the first user account on the vehicle.

Step 800: The network side device sends a verification feedback message to the mobile terminal.

It should be noted that step 800 and step 900 are optional steps, and therefore are represented by dashed lines in FIG. 5. The verification feedback message may be, for example, an indication message indicating that the verification performed by the network side device on the received login binding code succeeds or fails.

Step 900: The vehicle sends a login success indication to the mobile terminal, where the login success indication is used to indicate that the in-vehicle system is successfully logged in to with the first user account. For example, after receiving the login success indication, the mobile terminal may display prompt information such as a text or a picture, to prompt the user that the in-vehicle system is successfully logged in.

The following separately describes a plurality of implementations of step 300 and corresponding implementations of step 400 and step 500.

Embodiment 1

Figure 6A:
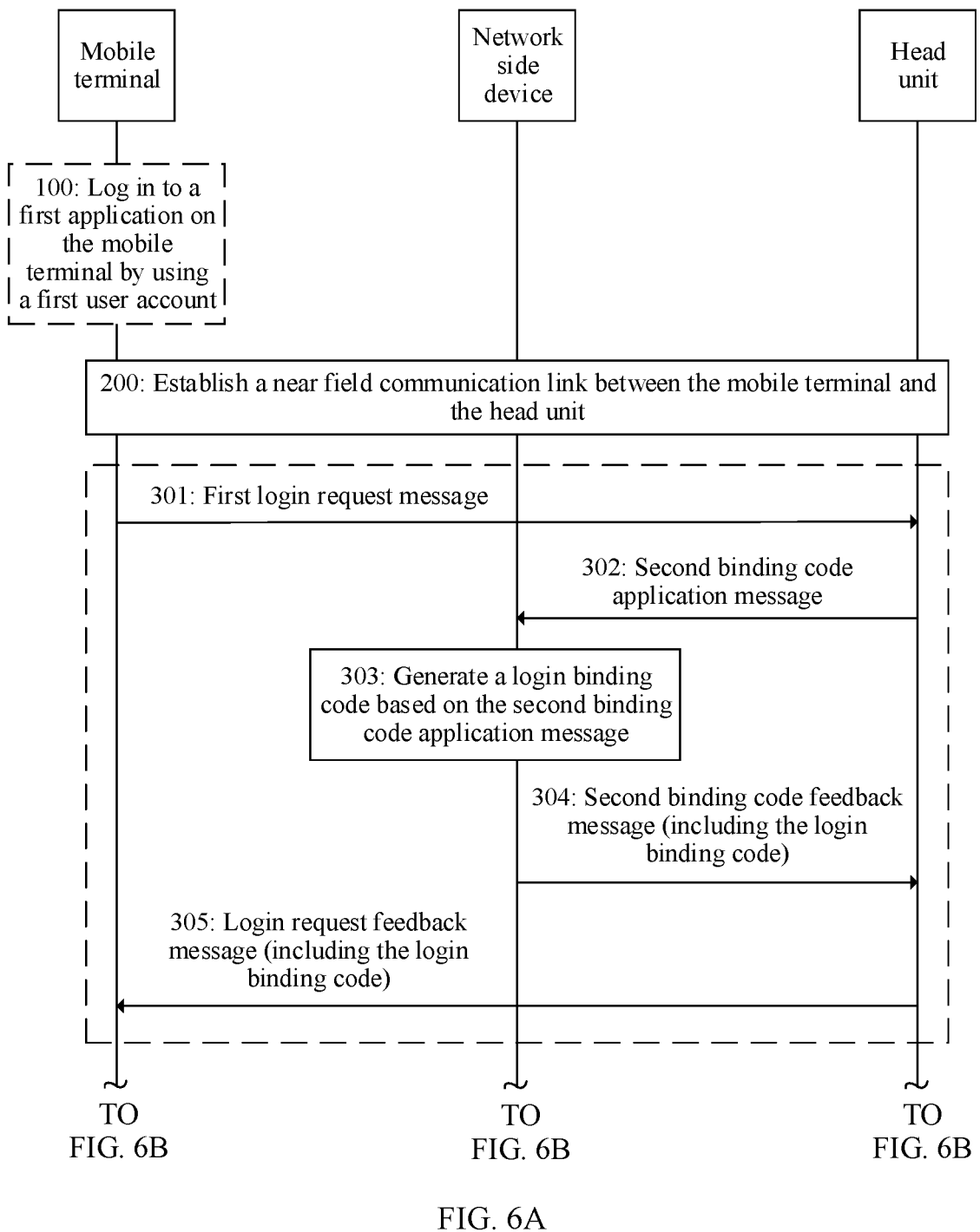
FIG. 6A and FIG. 6B are a schematic flowchart of a third method for logging in to an in-vehicle system according to an embodiment of this application.
Figure 6B:
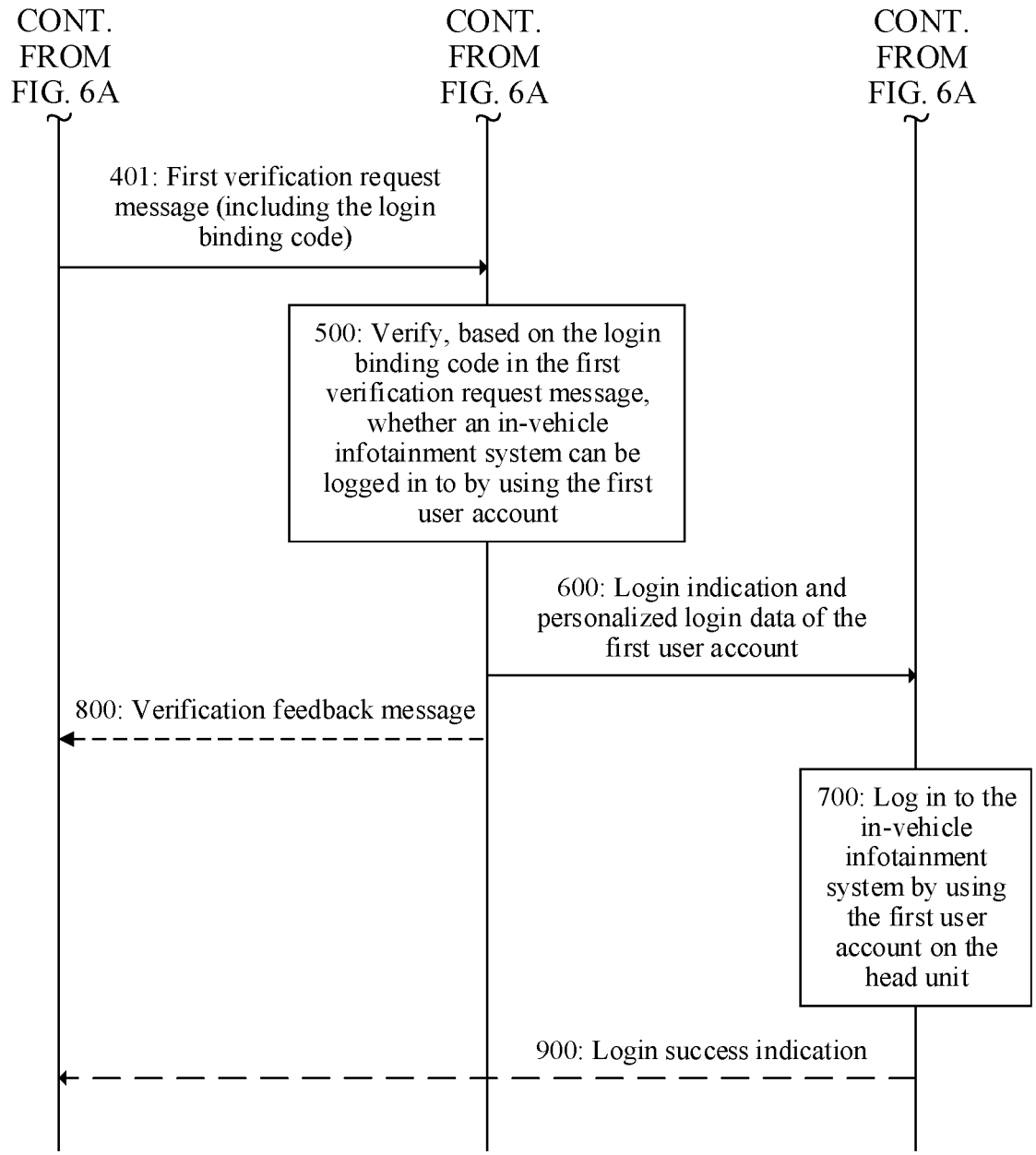

FIG. 6A and FIG. 6B are a schematic flowchart of a method for logging in to an in-vehicle system according to an embodiment of this application. FIG. 6A and FIG. 6B may be understood as details of some steps in FIG. 5. It can be learned by comparing FIG. 5 with FIG. 6A and FIG. 6B that a process in which the mobile terminal negotiates a login binding code with the vehicle in step 300 in FIG. 5 may include step 301 to step 305, and step 400 in FIG. 5 in which the mobile terminal and/or the vehicle provide/provides the login binding code to the network side device may include step 401.

Step 301: The mobile terminal sends a first login request message to the vehicle. Optionally, the mobile terminal may send the first login request message to the vehicle through a near field communication link.

Step 302: The vehicle sends a second binding code application message to the network side device. The second binding code application message includes at least one of the first user account, a mobile terminal identifier used to identify the mobile terminal, an in-vehicle system identifier used to identify the in-vehicle system, or a vehicle identifier used to identify the vehicle. For example, in step 200 or step 301, the mobile terminal sends at least one of the mobile terminal identifier or the first user account to the vehicle; or in another step (not step 200) before step 302, the mobile terminal sends at least one of the mobile terminal identifier or the first user account to the vehicle. This is not limited in this embodiment of this application.

Step 303: The network side device generates a login binding code based on the second binding code application message.

It should be understood that the second binding code application message has a plurality of cases, and corresponding step 303 has a plurality of implementations, which are separately described below by using examples.

Example 1: The second binding code application message includes the in-vehicle system identifier, in other words, a login binding code is generated based on the in-vehicle system identifier. For example, the network side device may store a correspondence between the in-vehicle system identifier and the login binding code. For example, refer to the following Table 1, Table 1 is an example of the correspondence.

TABLE 1

| In-vehicle system identifier | Login binding code |
| --- | --- |

Example 2: The second binding code application message includes the first user account, in other words, a login binding code is generated based on the first user account. For example, the network side device may store a correspondence between the first user account and the login binding code. For example, refer to the following Table 2, Table 2 is an example of the correspondence.

TABLE 2

| First user account | Login binding code |
| --- | --- |

Example 3: The second binding code application message includes the vehicle identifier, in other words, a login binding code is generated based on the vehicle identifier. For example, the network side device may store a correspondence between the vehicle identifier and the login binding code. For example, refer to the following Table 3, Table 3 is an example of the correspondence.

TABLE 3

| Vehicle identifier | Login binding code |
| --- | --- |

Example 4: The second binding code application message includes the mobile terminal identifier, in other words, a login binding code is generated based on the mobile terminal identifier. For example, the network side device may store a correspondence between the mobile terminal identifier and the login binding code. For example, refer to the following Table 4, Table 4 is an example of the correspondence.

TABLE 4

| Mobile terminal identifier | Login binding code |
| --- | --- |

It should be noted that the foregoing Example 1 to Example 4 may be used in combination. For example, Example 1 and Example 2 are used in combination. For example, the second binding code application message includes the first user account and the in-vehicle system identifier, in other words, a login binding code is generated based on the first user account and the in-vehicle system identifier. The network side device may store a correspondence among the in-vehicle system identifier, the first user account, and the login binding code. For example, refer to the following Table 5, Table 5 is an example of the correspondence.

TABLE 5

| In-vehicle system identifier | First user account | Login binding code |
| --- | --- | --- |

It should be understood that other combination manners of Example 1 to Example 4 are not enumerated one by one herein.

Step 304: The network side device sends a second binding code feedback message to the vehicle, where the second binding code feedback message includes the login binding code.

It may be understood that the second binding code feedback message may further include one or more messages in the second binding code application message, for example, at least one of the first user account, a mobile terminal identifier used to identify the mobile terminal, an in-vehicle system identifier used to identify the in-vehicle system, or a vehicle identifier used to identify the vehicle. For example, the second binding code application message includes the vehicle identifier, and the second binding code feedback message may also carry the vehicle identifier. After receiving the second binding code feedback message, the vehicle compares whether the vehicle identifier in the second binding code feedback message is consistent with the vehicle identifier in the second binding code application message. If the vehicle identifier in the second binding code feedback message is consistent with the vehicle identifier in the second binding code application message, it indicates that communication data between the vehicle and the network side device is not tampered, in other words, communication security is ensured, and a subsequent step may continue to be performed. Otherwise, execution of a subsequent step may be stopped.

Step 305: The vehicle sends a login request feedback message to the mobile terminal, where the login request feedback message includes the login binding code.

It may be understood that the login request feedback message may also carry one or more messages in the first login request message. For example, the first login request message includes the mobile terminal identifier, and the login request feedback message may also carry a mobile terminal identifier. After receiving the login request feedback message, the mobile terminal compares whether the mobile terminal identifier in the login request feedback message is consistent with the mobile terminal identifier in the first login request message. If the mobile terminal identifier in the login request feedback message is consistent with the mobile terminal identifier in the first login request message, it indicates that communication data between the mobile terminal and the vehicle is not tampered, in other words, communication security is ensured, and a subsequent step may continue to be performed. Otherwise, execution of a subsequent step may be stopped.

Therefore, in the embodiment shown in FIG. 6A and FIG. 6B, the mobile terminal negotiates a login binding code with the vehicle by using the foregoing step 301 to step 305, and the login binding code is generated by the network side device.

Step 401: The mobile terminal sends a first verification request message to the network side device, where the first verification request message includes the login binding code.

Step 500: The network side device verifies, based on the login binding code in the first verification request message, whether the in-vehicle system can be logged in to with the first user account, and performs a subsequent step when the verification succeeds; otherwise, the network side device stops performing a subsequent step.

For example, step 500 may include that the network side device determines, based on the login binding code, the first user account, and an in-vehicle system identifier, whether the in-vehicle system can be logged in to with the first user account. For example, if it is determined, based on the login binding code, the first user account, and the in-vehicle system identifier, that there is an association relationship between the vehicle and the mobile terminal, it is determined that the in-vehicle system can be logged in to with the first user account. For example, the login binding code is generated by the network side device based on the first user account and provided to the vehicle, and the first verification request message received by the network side device from the mobile terminal includes the login binding code and the in-vehicle system identifier. This indicates that the vehicle shares the login binding code with the mobile terminal and there is an association relationship between the vehicle and the mobile terminal, and therefore it is determined that the in-vehicle system can be logged in to with the first user account. Otherwise, the in-vehicle system cannot be logged in to with the first user account.

It should be noted that there are a plurality of generation manners for a login binding code, for example, the foregoing Example 1 to Example 4. First verification request messages that are in step 401 and that correspond to generation manners for different login binding codes may be different, and verification manners in step 500 may also be different. The following separately describes different login binding codes.

Case 1: Corresponding to the foregoing Example 1, a login binding code is generated by the network side device based on the in-vehicle system identifier. Correspondingly, a first verification request message further includes at least the first user account. Specifically, the following manners are included:

Manner 1.1: A first verification request message includes the login binding code and the first user account. In this manner, in step 500, if the network side device determines that the login binding code in the first verification request message is consistent with the login binding code in the correspondence (that is, Table 1) in Example 1, it is determined that the verification succeeds; otherwise, the verification fails.

Manner 1.2: A first verification request message includes the login binding code, the first user account, and the in-vehicle system identifier (for example, the vehicle sends the in-vehicle system identifier to the mobile terminal in step 305 or step 200). In this manner, in step 500, if the network side device determines that the login binding code in the first verification request message is consistent with the login binding code in the correspondence (that is, Table 1) in Example 1, it is determined that the verification succeeds; otherwise, the verification fails. Alternatively, in step 500, if the network side device determines that the login binding code in the first verification request message is consistent with the login binding code in the correspondence (that is, Table 1) in Example 1, and determines that the in-vehicle system identifier in the first verification request message is consistent with the in-vehicle system identifier in the correspondence (that is, Table 1) in Example 1, it is determined that the verification succeeds; otherwise, the verification fails. This manner has high security.

Optionally, the first verification request message may further include at least one of the mobile terminal identifier or the vehicle identifier.

For example, the first verification request message further includes the mobile terminal identifier. The network side device may perform further verification based on the mobile terminal identifier. For example, in an implementation, the second binding code application message includes the mobile terminal identifier, that is, the correspondence (that is, Table 1) includes a mobile terminal identifier. In this case, when the network device determines that the mobile terminal identifier in the first verification request message is consistent with the mobile terminal identifier in the correspondence (that is, Table 1), it is determined that the verification succeeds; otherwise, the verification fails. In another possible implementation, the network side device is an application server corresponding to a first application. In step 100, the first application is logged in to with the first user account, the first application reports the mobile terminal identifier to the network side device, and the network side device stores a correspondence A between the first user account and the mobile terminal identifier. Therefore, the network side device receives a second verification request message, where the second verification request message includes the login binding code, the first user account, and the mobile terminal identifier. When the network side device determines that the mobile terminal identifier and the first user account in the second verification request message are consistent with the correspondence A, and the login binding code in the second verification request message is consistent with the login binding code in Table 1, it is determined that the verification succeeds; otherwise, the verification fails.

For example, the first verification request message further includes the vehicle identifier, and the network side device may perform further verification based on the mobile terminal identifier. For example, in an implementation, the second binding code application message includes the vehicle identifier, that is, the correspondence (that is, Table 1) further includes a vehicle identifier. In this case, when the network side device determines that the vehicle identifier in the first verification request message is consistent with the vehicle identifier in the correspondence (that is, Table 1), it is determined that the verification succeeds; otherwise, the verification fails.

Case 2: Corresponding to the foregoing Example 2, that is, a login binding code is generated by the network side device based on the first user account, a first verification request message further includes at least the in-vehicle system identifier. Specifically, the following manners are included:

Manner 2.1: A first verification request message includes the login binding code and the in-vehicle system identifier (for example, the vehicle sends the in-vehicle system identifier to the mobile terminal in step 305 or step 200). In this manner, after receiving the first verification request message, the network side device determines that the login binding code in the first verification request message is consistent with the login binding code in the correspondence (that is, Table 2) in Example 2, it is determined that the verification succeeds; otherwise, the verification fails.

Manner 2.2: A first verification request message includes the login binding code, the in-vehicle system identifier, and the first user account. In this manner, in step 500, if the network side device determines that the login binding code in the first verification request message is consistent with the login binding code in the correspondence (that is, Table 2) in Example 2, it is determined that the verification succeeds; otherwise, the verification fails. Alternatively, in step 500, if the network side device determines that the login binding code in the first verification request message is consistent with the login binding code in the correspondence (that is, Table 2) in Example 2, and determines that the first user account in the first verification request message is consistent with the first user account in the correspondence (that is, Table 2) in Example 2, it is determined that the verification succeeds; otherwise, the verification fails.

Optionally, the first verification request message may further include at least one of the mobile terminal identifier or the vehicle identifier. For a function of the mobile terminal identifier or the vehicle identifier in the first verification request message, refer to the description in Case 1. Details are not described herein again.

Case 3: Corresponding to the foregoing Example 3, a login binding code is generated by the network side device based on the vehicle identifier, and a first verification request message further includes at least the in-vehicle system identifier, the first user account, and the vehicle identifier. In this case, in step 500, if the network side device determines that the login binding code in the first verification request message is consistent with the login binding code in the correspondence (that is, Table 3) in Example 3, it is determined that the verification succeeds; otherwise, the verification fails. Alternatively, in step 500, if the network side device determines that the login binding code in the first verification request message is consistent with the login binding code in the correspondence (that is, Table 3) in Example 3, and determines that the vehicle identifier in the first verification request message is consistent with the vehicle identifier in the correspondence (that is, Table 3) in Example 3, it is determined that the verification succeeds; otherwise, the verification fails.

Optionally, the first verification request message may further include the mobile terminal identifier.

Case 4: Corresponding to Example 4, a login binding code is generated by the network side device based on the mobile terminal identifier, and a first verification request message includes at least the in-vehicle system identifier, the first user account, and the mobile terminal identifier. In this case, in step 500, if the network side device determines that the login binding code in the first verification request message is consistent with the login binding code in the correspondence (that is, Table 4) in Example 4, it is determined that the verification succeeds; otherwise, the verification fails. Alternatively, in step 500, if the network side device determines that the login binding code in the first verification request message is consistent with the login binding code in the correspondence (that is, Table 4) in Example 4, and determines that the mobile terminal identifier in the first verification request message is consistent with the mobile terminal identifier in the correspondence (that is, Table 4) in Example 4, it is determined that the verification succeeds; otherwise, the verification fails.

Optionally, the first verification request message may further include a vehicle identifier.

It should be noted that, as described above, Example 1 to Example 4 may be used in combination. It is assumed that Example 1 and Example 2 are combined, that is, a login binding code is generated by the network side device based on the first user account and the in-vehicle system identifier. In this case, a first verification request message may be the first verification request message in any one of the foregoing Case 1 to Case 4.

It should be noted that a manner of generating a login binding code is determined by the second binding code application message, and the manner of generating the login binding code is associated with content of the first verification message. In a possible implementation, a manner of generating the login binding code and content of the first verification request message are agreed upon in advance. For example, it is agreed in advance that the login binding code is generated based on the first user account, and the first verification request message includes the login binding code and the vehicle identifier. In actual application, this agreement is followed. To be specific, the second binding code application message sent by the vehicle carries at least the first user account, the network side device generates the login binding code based on the first user account, and the first verification request message sent by the mobile terminal includes the login binding code and the vehicle identifier. In another possible implementation, it is not agreed in advance. It is assumed that the login binding code is generated based on the first user account, the vehicle may be notified that the login binding code is generated based on the first user account. For example, the second binding code feedback message in step 304 carries an indication message 1, where the indication message 1 is used to indicate that the login binding code is generated based on the first user account; or a mark is added to the login binding code, where the mark is used to indicate that the login binding code is generated based on the first user account. The vehicle notifies, by using step 305, the mobile terminal that the login binding code is generated based on the first user account. For example, the login request feedback message in step 305 may carry the indication message 1. Correspondingly, the mobile terminal may determine content of the first verification request message based on that the login binding code is generated based on the first user account. For a specific implementation process, refer to content in the foregoing Case 2, and details are not described herein again.

Embodiment 2

Figure 7A:
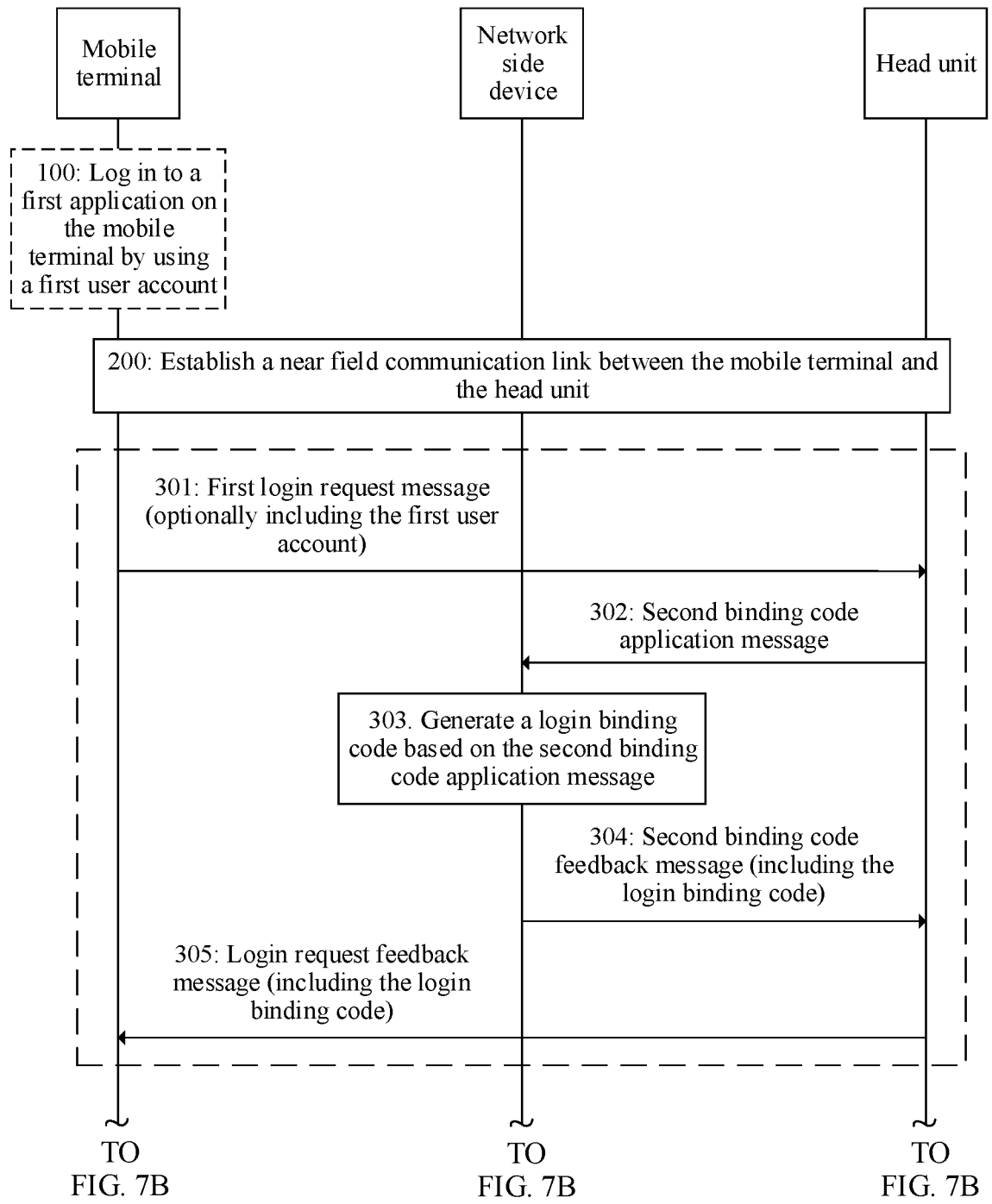
FIG. 7A and FIG. 7B are a schematic flowchart of a fourth method for logging in to an in-vehicle system according to an embodiment of this application.
Figure 7B:
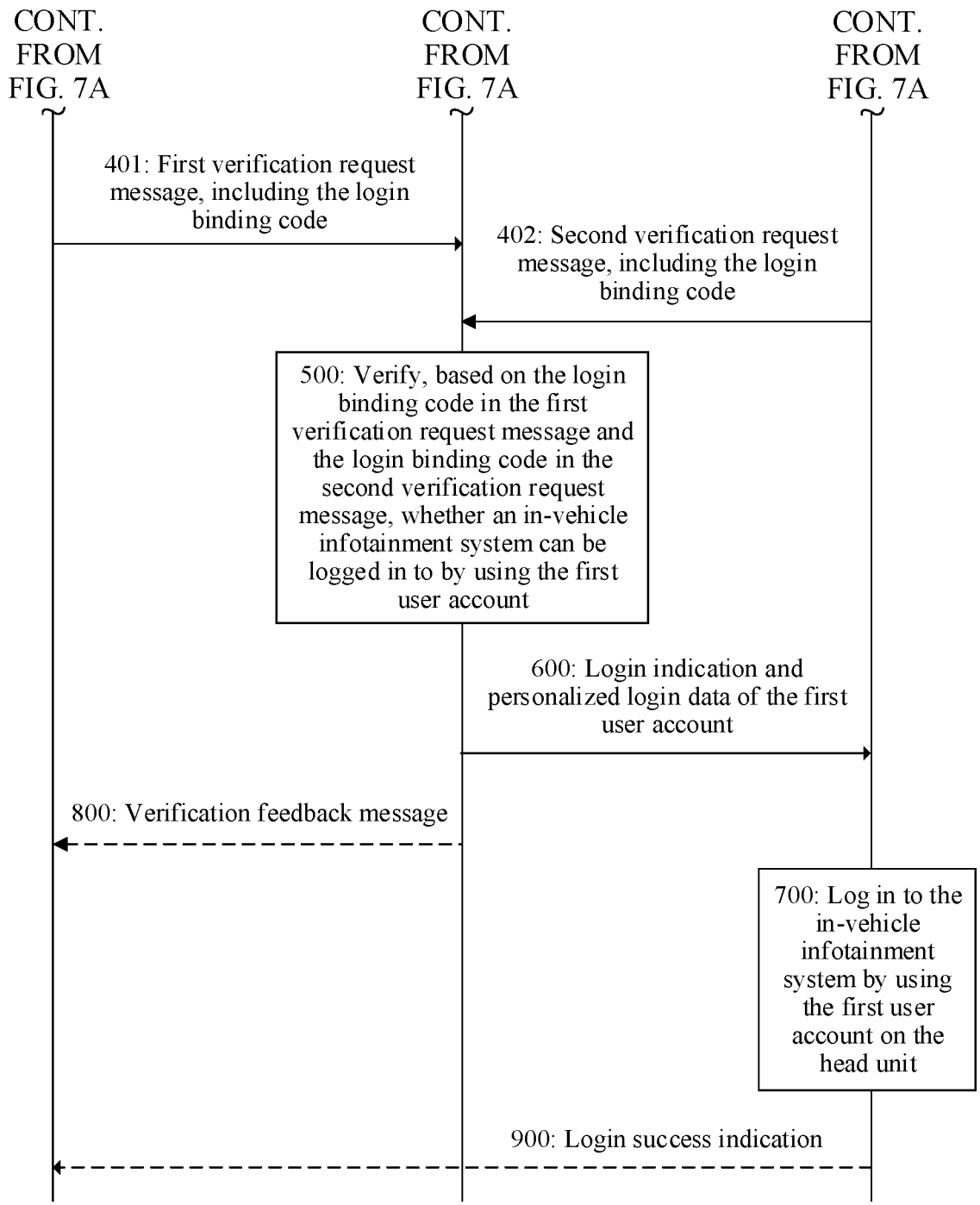

FIG. 7A and FIG. 7B are a schematic flowchart of a method for logging in to an in-vehicle system according to an embodiment of this application. FIG. 7A and FIG. 7B may be understood as details of some steps in FIG. 5. It can be learned by comparing FIG. 5 with FIG. 7A and FIG. 7B that a process in which the mobile terminal negotiates a login binding code with the vehicle in step 300 in FIG. 5 may include step 301 to step 305 in FIG. 7A. Descriptions of step 301 to step 305 are the same as those in Embodiment 1, and details are not described herein again. Step 400 in FIG. 5 includes step 401 and step 402 in FIG. 7B.

Step 401: The mobile terminal sends a first verification request message to the network side device, where the first verification request message includes the login binding code.

Step 402: The vehicle sends a second verification request message to the network side device, where the second verification request message includes the login binding code.

It should be noted that there are a plurality of manners for generating a login binding code, for example, the foregoing Example 1 to Example 4. Correspondingly, there are a plurality of cases for a first verification request message, for example, the foregoing Case 1 to Case 4.

The second verification request message may be the same as or different from the first verification request message. That the second verification request message is different from the first verification request message is used as an example. In the foregoing Case 1, that is, the login binding code is generated by the network side device based on the in-vehicle system identifier, the first verification request message may be in the manner 1.1, and the second verification request message may be in the manner 1.2. In other words, for one of the foregoing Cases 1 to 4, the first verification request message and the second verification request message may be different. Alternatively, for example, in the foregoing Case 1, that is, the login binding code is generated by the network side device based on the in-vehicle system identifier, the first verification request message includes the first user account (for example, Manner 1.1 or Manner 1.2 in the foregoing Case 1), and the second verification request message includes the in-vehicle system identifier (for example, Manner 2.1 or Manner 2.2 in the foregoing Case 2). Alternatively, the first verification request message includes the in-vehicle system identifier (for example, Manner 2.1 or Manner 2.2 in the foregoing Case 2), and correspondingly, the second verification request message includes the first user account (for example, Manner 1.1 or Manner 1.2 in the foregoing Case 1). In the foregoing Case 3, that is, the login binding code is generated by the network side device based on the vehicle identifier, the first verification request message may be the first verification request message in Case 3, and the second verification request message may be the first verification request message in any one of Case 2, Case 1, and Case 4.

Step 500: Verify, based on the login binding code in the first verification request message and the login binding code in the second verification request message, whether the in-vehicle system can be logged in to with the first user account, perform a subsequent step when the verification succeeds, otherwise, stop performing a subsequent step.

For the first verification request message, the network side device performs verification with reference to the description of Step 500 in Embodiment 1. A verification manner for the second verification request message is similar to a verification manner for the first verification request message, and details are not described again. The network side device determines that the first verification request message and the second verification request message are verified, and determines that the in-vehicle system can be logged in to with the first user account; otherwise, the in-vehicle system cannot be logged in to with the first user account.

Embodiment 3

Figure 8A:
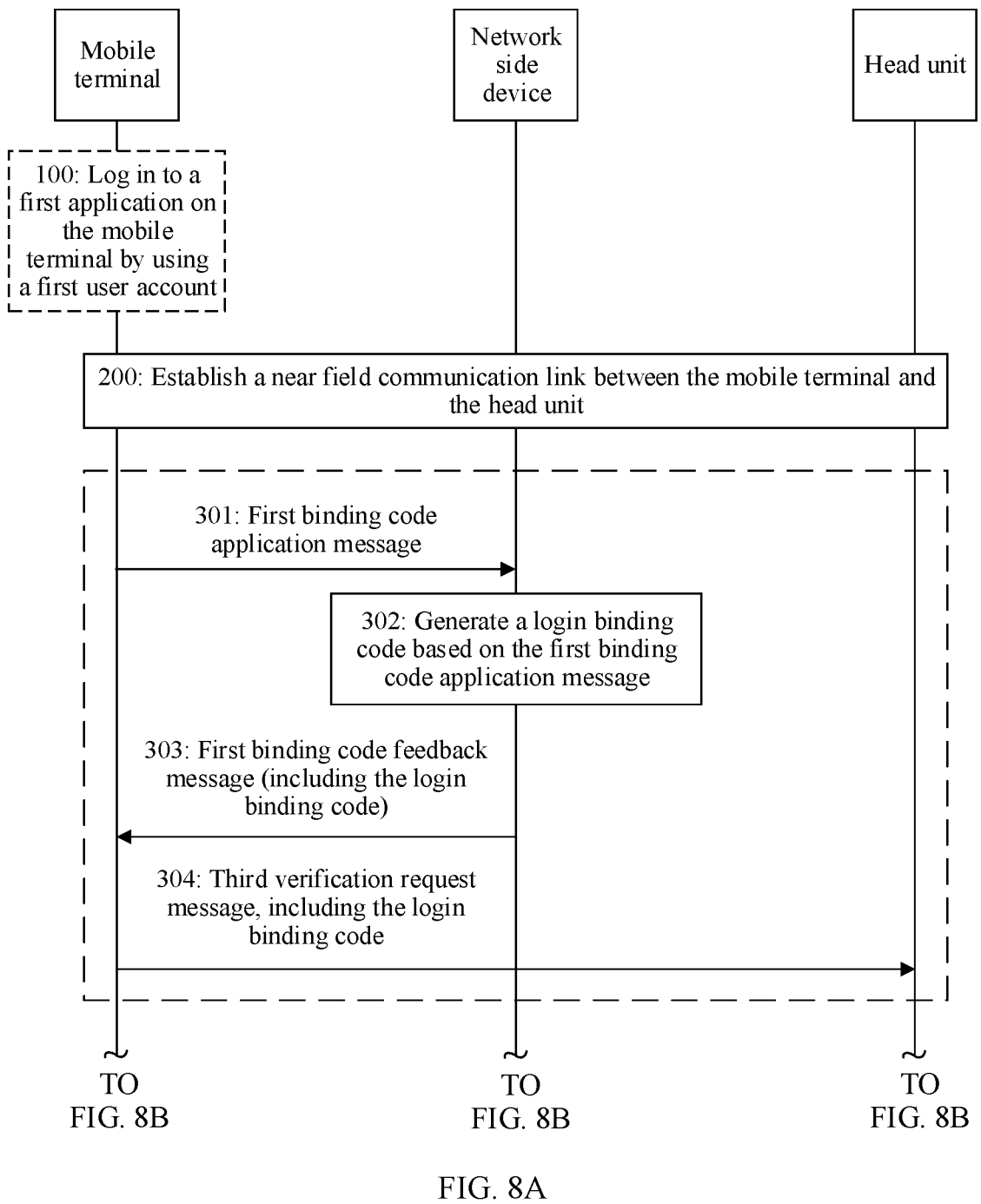
FIG. 8A and FIG. 8B are a schematic flowchart of a fifth method for logging in to an in-vehicle system according to an embodiment of this application.
Figure 8B:
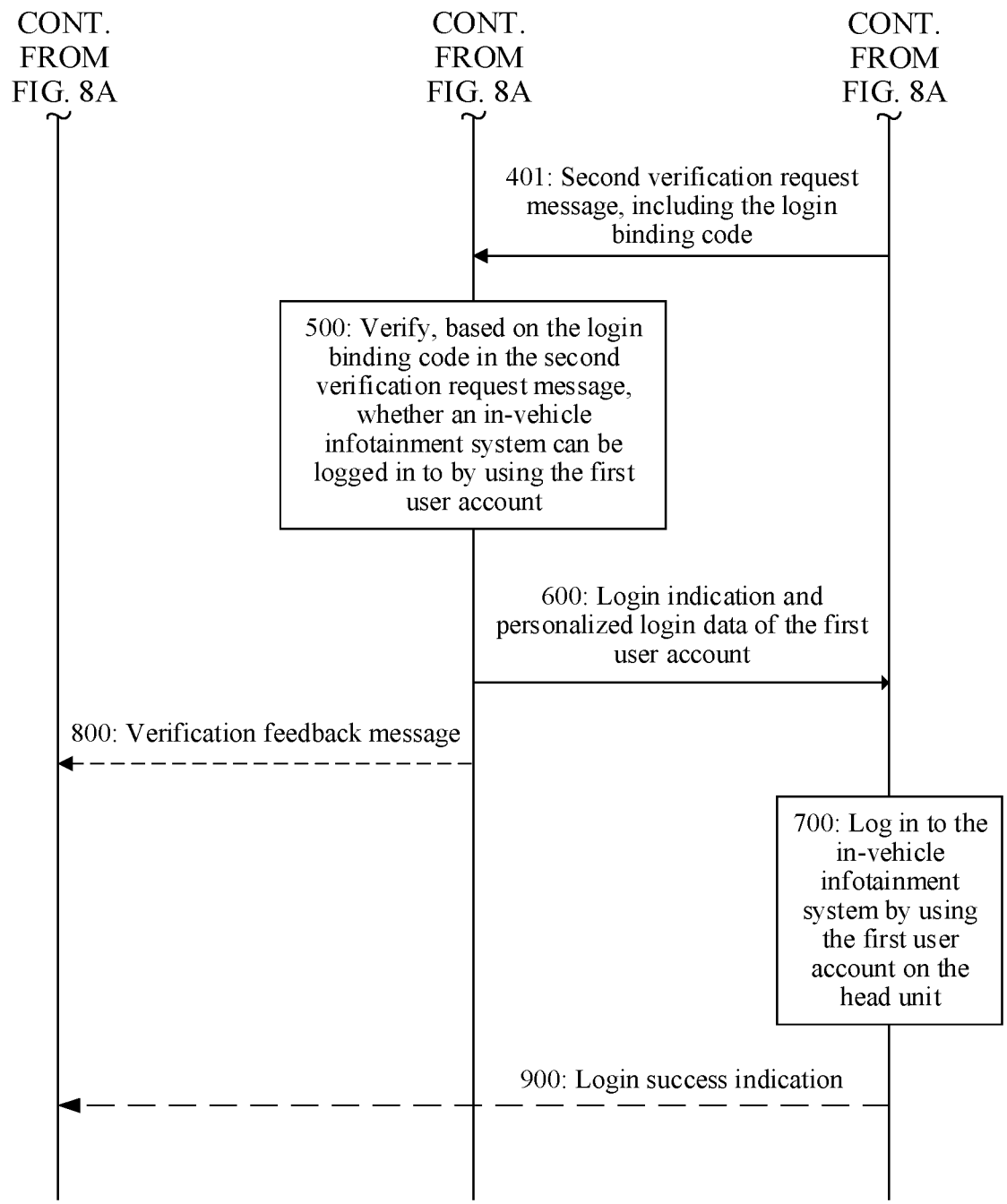

FIG. 8A and FIG. 8B are a schematic flowchart of a method for logging in to an in-vehicle system according to an embodiment of this application. FIG. 8A and FIG. 8B may be understood as details of some steps in FIG. 5. It can be learned by comparing FIG. 5 with FIG. 8A and FIG. 8B that a process in which the mobile terminal negotiates a login binding code with the vehicle in step 300 in FIG. 5 may include step 301 to step 304 in FIG. 8A. Step 400 in FIG. 5 includes step 401 in FIG. 8B.

Step 301: The mobile terminal sends a first binding code application message to the network side device. The first binding code application message includes at least one of the first user account, a mobile terminal identifier, an in-vehicle system identifier, or a vehicle identifier.

Optionally, before step 301, the vehicle sends at least one of the in-vehicle system identifier or the vehicle identifier to the mobile terminal. For example, the vehicle sends at least one of the in-vehicle system identifier or the vehicle identifier in step 300. Alternatively, the mobile terminal may further send a second login request message (not shown in FIG. 8A or FIG. 8B) to the vehicle. For example, after establishing a near field communication link to the vehicle, the mobile terminal immediately sends the second login request message to the mobile terminal. For example, the second login request message may be sent before step 301. The vehicle may further send a second login request feedback message (not shown in FIG. 8A or FIG. 8B) to the mobile terminal. The second login request feedback message may include at least one of the in-vehicle system identifier or the vehicle identifier.

Step 302: The network side device generates a login binding code based on the first binding code application message. For an implementation of step 302, refer to the process of generating the login binding code in Embodiment 1, for example, Example 1 to Example 4. Details are not described herein again.

Step 303: The network side device sends a first binding code feedback message to the mobile terminal, where the first binding code feedback message includes the login binding code.

Step 304: The mobile terminal sends a third verification request message to the vehicle, where the third verification request message includes the login binding code. Optionally, the third verification request message may further include at least one of the mobile terminal identifier or the first user account.

It may be understood that the third verification request message may be the second login request message, or a message that is sent to the vehicle after the mobile terminal sends the second login request information and that is intended to indirectly send the third verification request message to the vehicle to provide the login binding code for the network side device.

Step 401: The vehicle sends a second verification request message to the network side device, where the second verification request message includes the login binding code. Content of the second verification request message is related to a manner of generating the login binding code. For details, refer to the description of the first verification request message in Embodiment 1. Details are not described herein again.

Step 500: The network side device verifies, based on the login binding code in the second verification request message, whether the in-vehicle system can be logged in to with the first user account, performs a subsequent step when the verification succeeds, otherwise, stops performing a subsequent step.

In this embodiment of this application, corresponding to the plurality of examples (Example 1 to Example 4) of step 302, correspondingly, there are a plurality of cases for the second verification request message, and correspondingly, verification manners in step 500 are also different. For details, refer to descriptions of Case 1 to Case 4 in Embodiment 1. A difference lies in that in this embodiment, the first verification request message in Case 1 to Case 4 in Embodiment 1 needs to be replaced with the second verification request message.

Embodiment 4

Figure 9A:
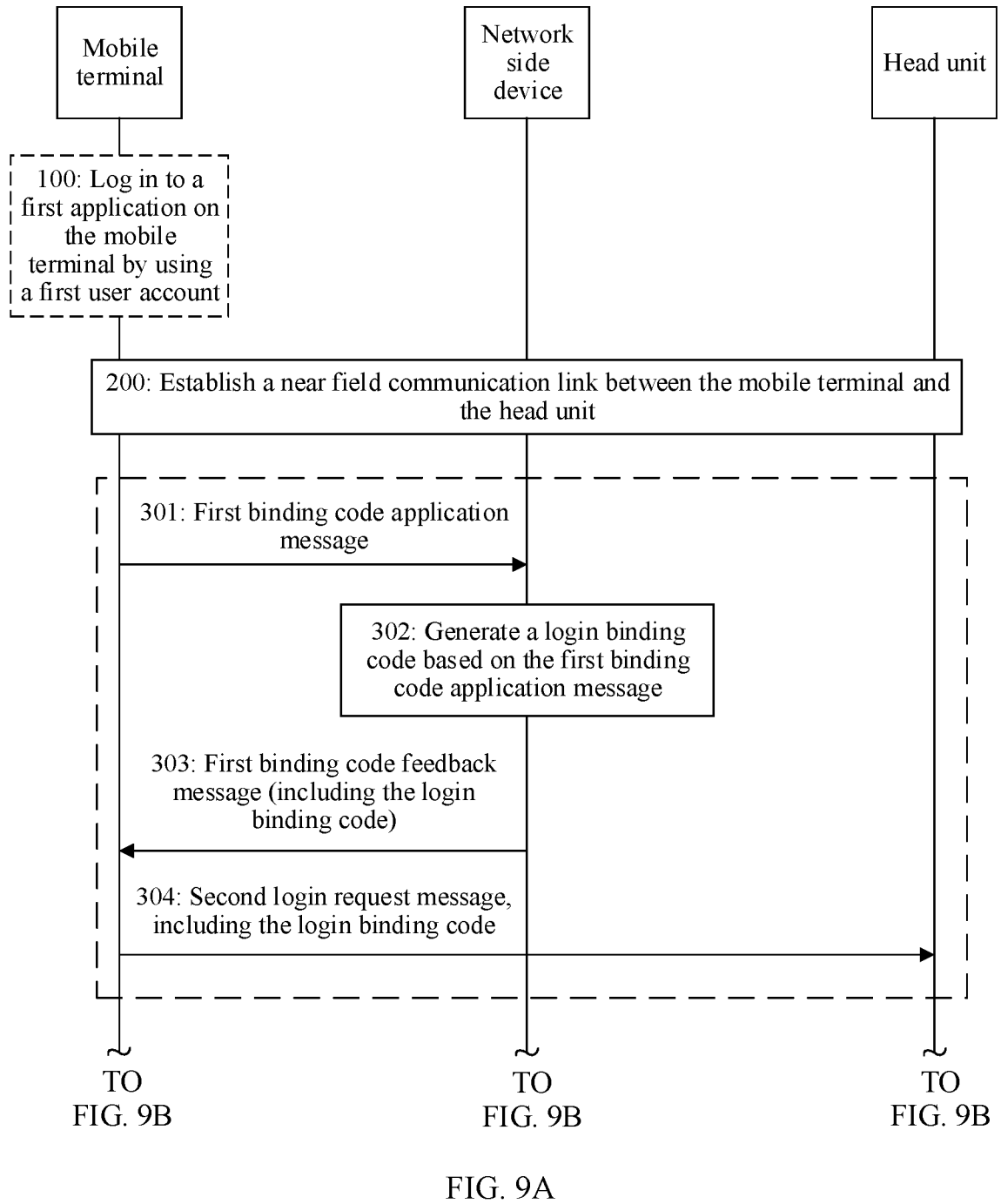
FIG. 9A and FIG. 9B are a schematic flowchart of a sixth method for logging in to an in-vehicle system according to an embodiment of this application.
Figure 9B:
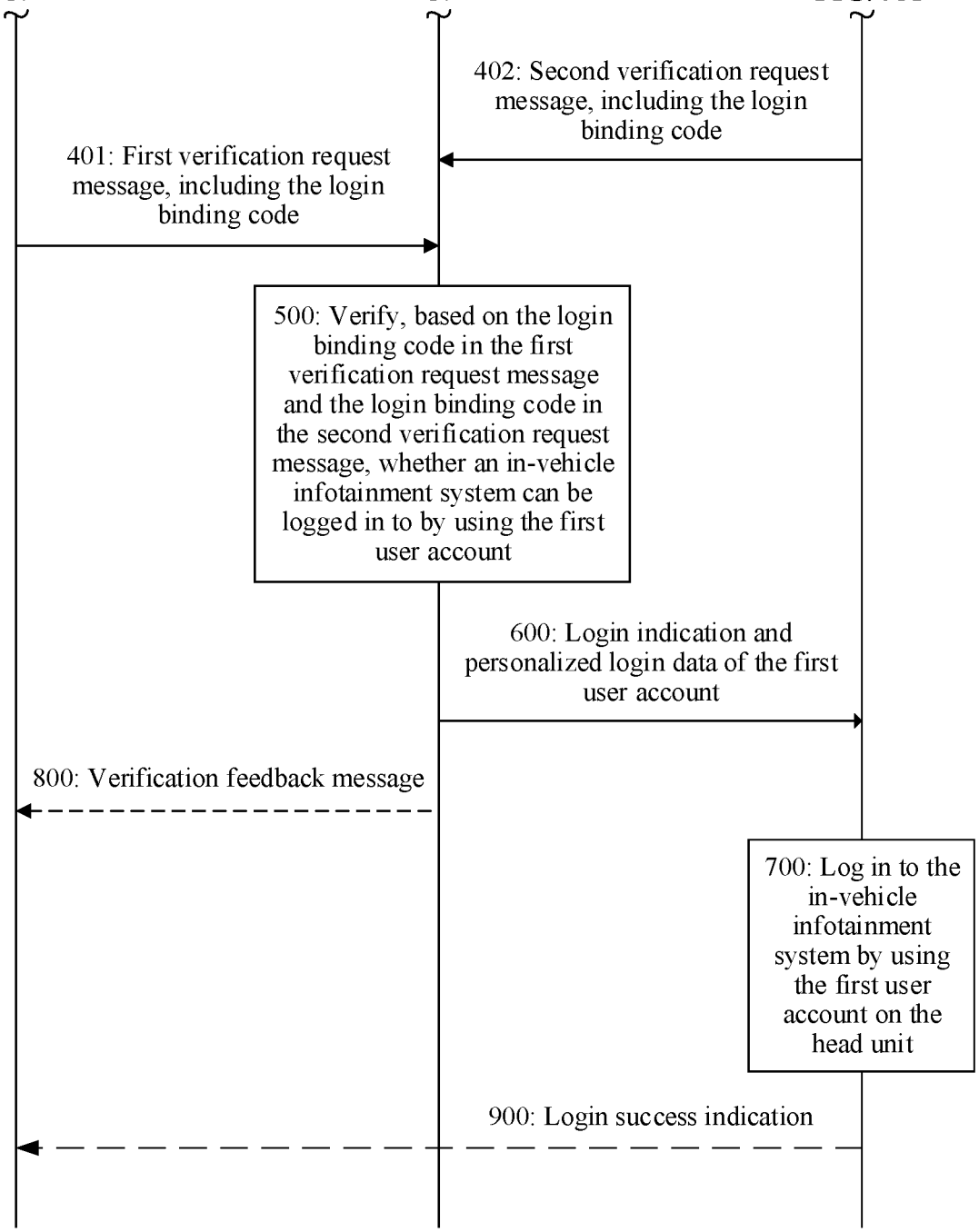

FIG. 9A and FIG. 9B are a schematic flowchart of a method for logging in to an in-vehicle system according to an embodiment of this application. FIG. 9A and FIG. 9B may be understood as details of some steps in FIG. 5. It can be learned by comparing FIG. 5 with FIG. 9A and FIG. 9B that a process in which the mobile terminal negotiates a login binding code with the vehicle in step 300 in FIG. 5 may include step 301 to step 304 in FIG. 9A. Step 400 in FIG. 5 includes step 401 and step 402 in FIG. 9B.

A difference between step 301 to step 304 and the embodiment shown in FIG. 8A and FIG. 8B is step 304. Therefore, details about step 301 to step 303 are not described again.

Step 304: The mobile terminal sends a second login request message to the vehicle, where the second login request message includes the login binding code. Optionally, the second login request message may further include at least one of the mobile terminal identifier or the first user account.

It should be noted that, in the embodiment shown in FIG. 9A and FIG. 9B, after requesting the login binding code from the network side device, the mobile terminal initiates a login request to the vehicle. However, in the embodiment shown in FIG. 8A and FIG. 8B, the mobile terminal first initiates a login request to the vehicle (for example, sends the second login request to the vehicle before step 304), and then sends a third verification request message to the vehicle, to indirectly provide the login binding code to the network side device in a manner of sending the third verification request message to the vehicle.

Step 401: The mobile terminal sends a first verification request message to the network side device, where the first verification request message includes the login binding code.

Step 402: The vehicle sends a second verification request message to the network side device, where the second verification request message includes the login binding code.

It should be noted that there are a plurality of manners for generating a login binding code. Corresponding to the foregoing Example 1 to Example 4, there are a plurality of cases for a first verification request message, for example, the foregoing Case 1 to Case 4. The second verification request message may be the same as or different from the first verification request message. For details, refer to the description in Embodiment 2. Details are not described again.

Step 500: The network side device verifies, based on the login binding code in the first verification request message and the login binding code in the second verification request message, whether the in-vehicle system can be logged in to with the first user account, performs a subsequent step when the verification succeeds, otherwise, stops performing a subsequent step. For the description of step 500, refer to the description of step 500 in Embodiment 2. Details are not described again.

It should be noted that, in the foregoing Embodiment 1 to Embodiment 4, the login binding code is generated by the network side device. The following describes some other embodiments. In these embodiments, the login binding code may alternatively be generated by the mobile terminal, or generated by the vehicle, or generated by both the mobile terminal and the vehicle.

Embodiment 5

Figure 10A:
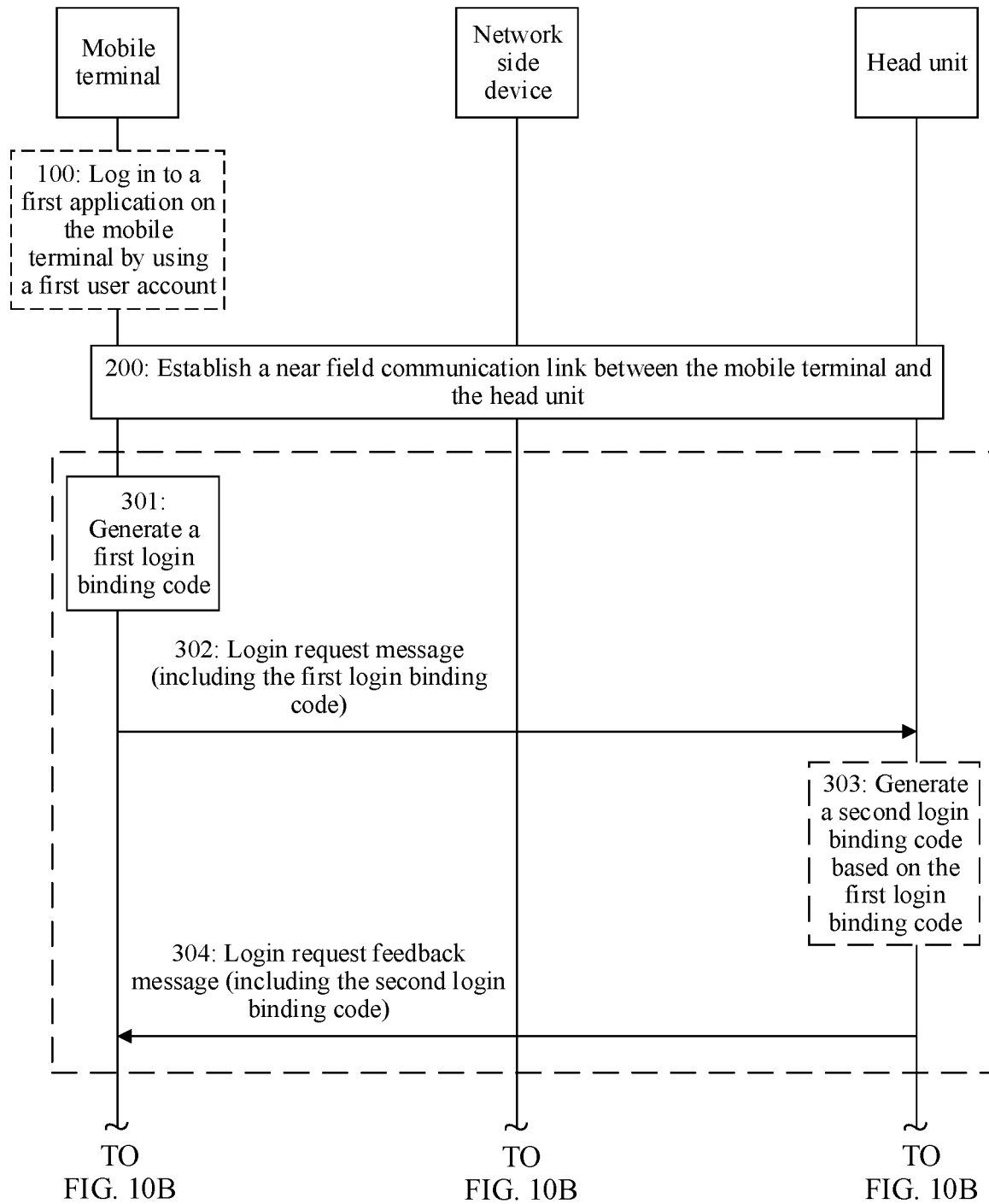
FIG. 10A and FIG. 10B are a schematic flowchart of a seventh method for logging in to an in-vehicle system according to an embodiment of this application.
Figure 10B:
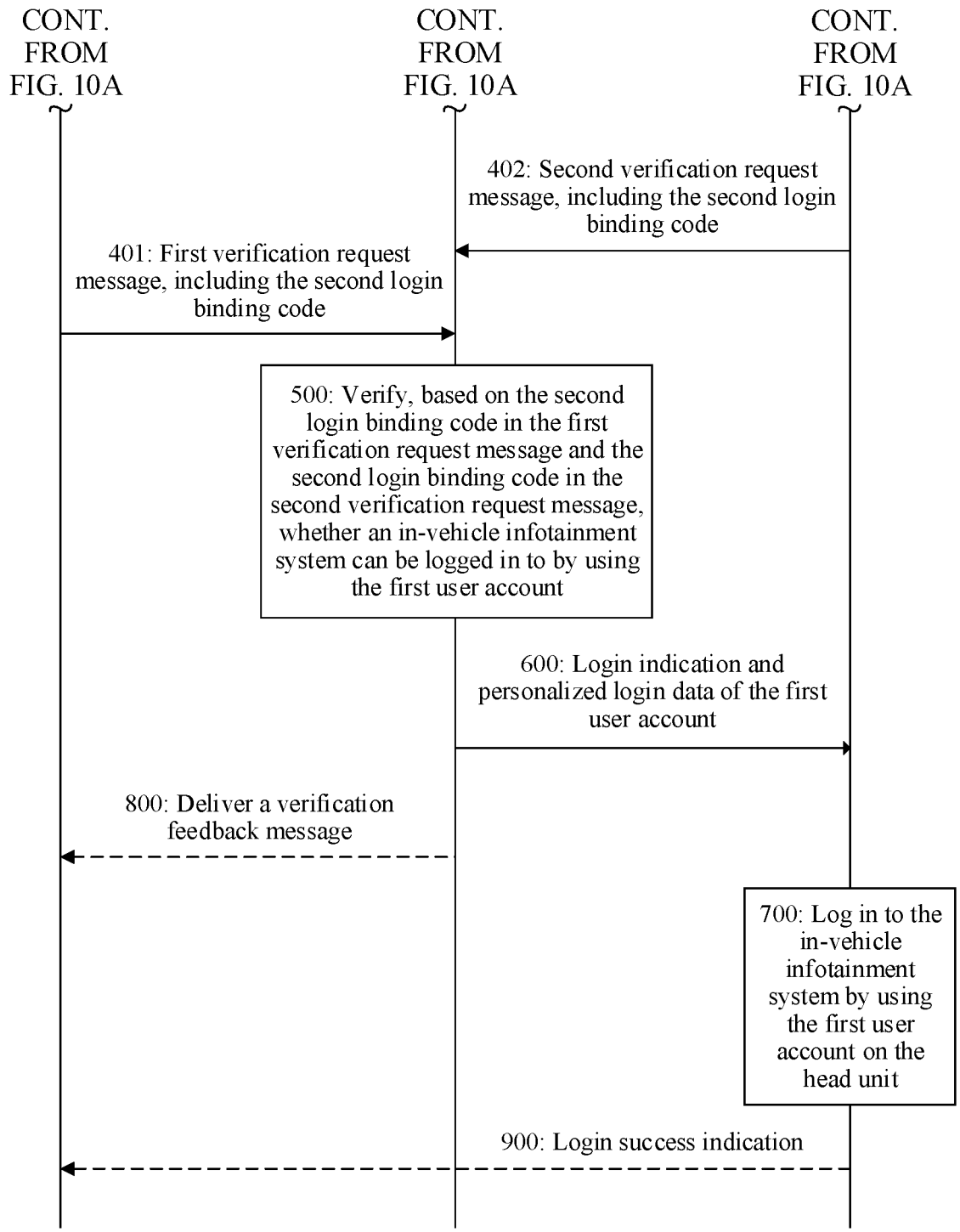

FIG. 10A and FIG. 10B are a schematic flowchart of a method for logging in to an in-vehicle system according to an embodiment of this application. FIG. 10A and FIG. 10B may be understood as details of some steps in FIG. 5. It can be learned by comparing FIG. 5 with FIG. 10A and FIG. 10B that a process in which the mobile terminal negotiates a login binding code with the vehicle in step 300 in FIG. 5 may include step 301 to step 304 in FIG. 10A. Step 400 in FIG. 5 includes step 401 and step 402 in FIG. 10B.

Step 301: The mobile terminal generates a first login binding code. For example, the mobile terminal may generate the first login binding code based on at least one of the first user account, a mobile terminal identifier, an in-vehicle system identifier, or a vehicle identifier. For example, in step 200, the vehicle sends at least one of the in-vehicle system identifier or the vehicle identifier to the mobile terminal; or in another step before step 301, the vehicle sends at least one of the in-vehicle system identifier or the vehicle identifier to the mobile terminal. This is not limited in this embodiment of this application.

Specifically, for a process of generating the login binding code, refer to the description of step 303 (for example, the foregoing Example 1 to Example 4) in Embodiment 1, and details are not described herein again.

Step 302: The mobile terminal sends a login request message to the vehicle, where the login request message may include the first login binding code. Optionally, the login request message may further include at least one of the first user account or the mobile terminal identifier.

Step 303: The vehicle generates a second login binding code based on the first login binding code.

The first login binding code may be the same as the second login binding code. In this case, step 303 does not need to be performed. Therefore, step 303 is represented by a dashed line in the figure. Alternatively, the first login binding code may be different from the second login binding code. For example, the first login binding code is generated by the mobile terminal based on the first user account, and the second login binding code may be generated by the vehicle based on the first login binding code and the in-vehicle system identifier. For example, the vehicle generates a third login binding code based on the in-vehicle system identifier. The second login binding code may be a combination of the first login binding code and the third login binding code, for example, the third login binding code is added to the first login binding code.

Step 304: The vehicle sends a login request feedback message to the mobile terminal, where the login request feedback message includes the second login binding code.

It should be noted that if step 303 is not performed, step 304 may carry the first login binding code, or carry an indication message indicating that the first login binding code is agreed, or carry no login binding code. After receiving the login request feedback message, the mobile terminal determines that the vehicle agrees with the first login binding code.

Step 401: The mobile terminal sends a first verification request message to the network side device, where the first verification request message includes the second login binding code, and further includes at least one of the first user account or the in-vehicle system identifier. Optionally, the first verification request message may further include the vehicle identifier and/or the mobile terminal identifier.

Step 402: The vehicle sends a second verification request message to the network side device, where the second verification request message includes a second login binding code, and further includes at least one of the first user account or the in-vehicle system identifier. Optionally, the second verification request message may further include the vehicle identifier and/or the mobile terminal identifier.

Step 500: The network side device verifies, based on the second login binding code in the first verification request message and the second login binding code in the second verification request message, whether the in-vehicle system can be logged in to with the first user account, performs a subsequent step when the verification succeeds, otherwise, stops performing a subsequent step.

For example, the first verification request message includes a second login binding code and the first user account, and the second verification request message includes a second login binding code and the in-vehicle system identifier; or the first verification request message includes a second login binding code and the in-vehicle system identifier, and the second verification request message includes the second login binding code and the first user account. The network side device determines that the verification succeeds if the second login binding code in the first verification request message is the same as the second login binding code in the second verification request message; otherwise, the verification fails.

For another example, the first verification request message and the second verification request message further include the vehicle identifier. The network side device determines that the verification succeeds if the second login binding code in the first verification request message is the same as the second login binding code in the second verification request message, and that the vehicle identifier in the first verification message is the same as the vehicle identifier in the second verification message; otherwise, the verification fails.

Embodiment 6

Figure 11A:
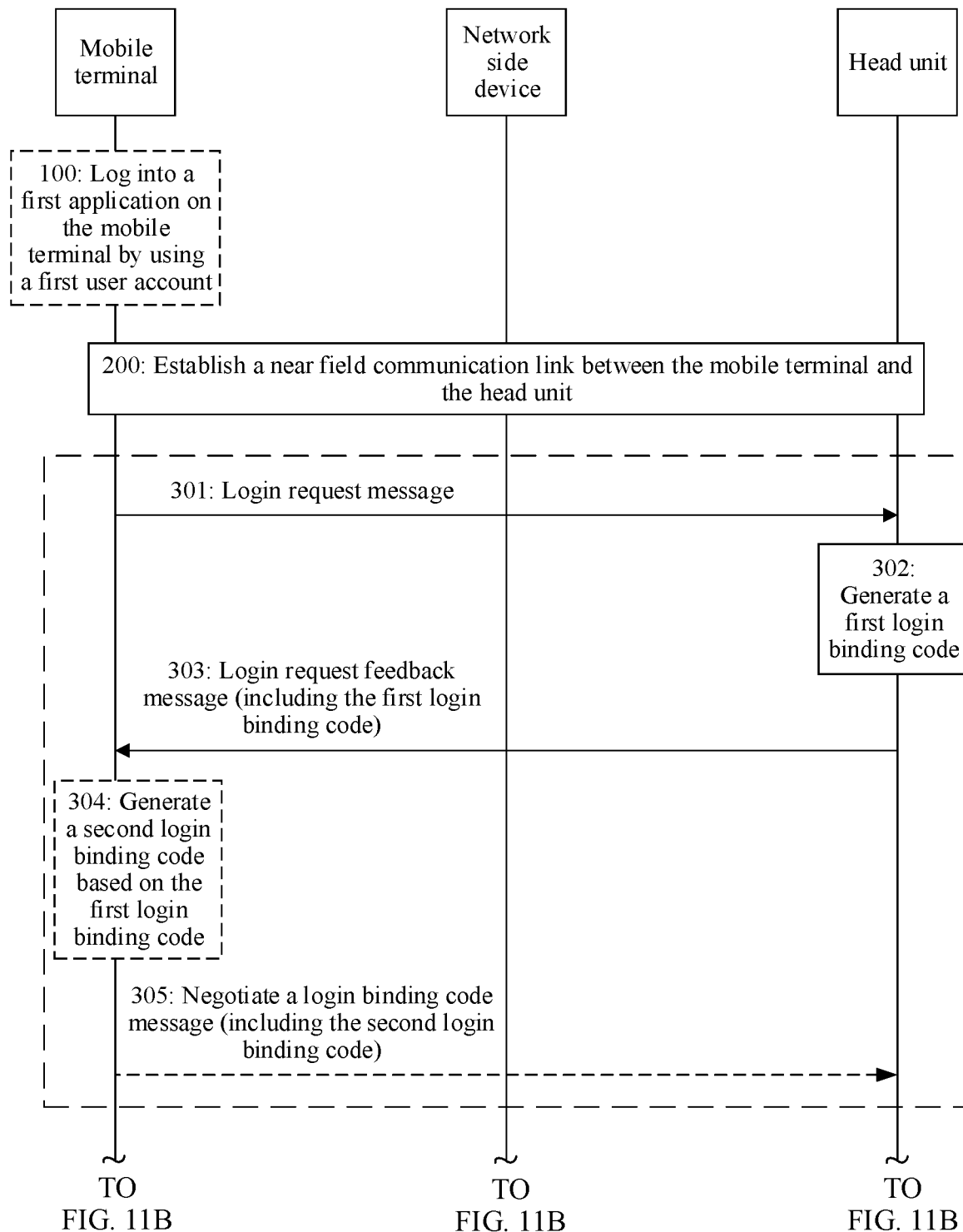
FIG. 11A and FIG. 11B are a schematic flowchart of an eighth method for logging in to an in-vehicle system according to an embodiment of this application.
Figure 11B:
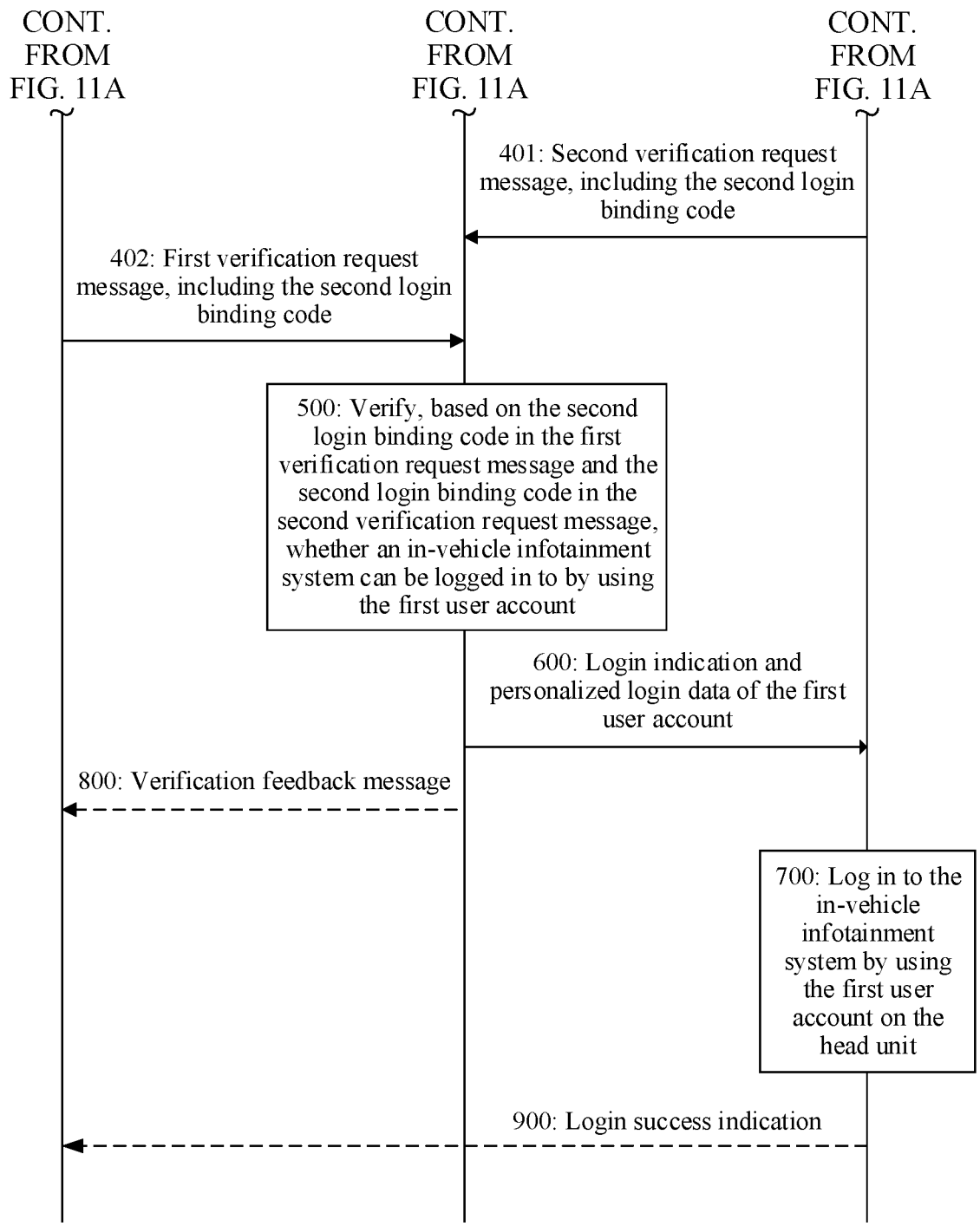

FIG. 11A and FIG. 11B are a schematic flowchart of a method for logging in to an in-vehicle system according to an embodiment of this application. FIG. 11A and FIG. 11B may be understood as details of some steps in FIG. 5. It can be learned by comparing FIG. 5 with FIG. 11A and FIG. 11B that a process in which the mobile terminal negotiates a login binding code with the vehicle in step 300 in FIG. 5 may include step 301 to step 304 in FIG. 11A.

Step 301: The mobile terminal sends a login request message to the vehicle. Optionally, the login request message may carry at least one of the first user account or the mobile terminal identifier.

Step 302: The vehicle generates a first login binding code. For example, the vehicle may generate the first login binding code based on at least one of the first user account, a mobile terminal identifier, an in-vehicle system identifier, or a vehicle identifier. For details, refer to the description of step 303 in Embodiment 1, and details are not described herein again.

Step 303: The vehicle sends a login request feedback message to the mobile terminal, where the login request feedback message includes the first login binding code.

Step 304: The mobile terminal generates a second login binding code based on the first login binding code.

The first login binding code may be the same as the second login binding code. In this case, step 304 does not need to be performed. Therefore, step 304 is represented by a dashed line in the figure. Alternatively, the first login binding code may be different from the second login binding code. For example, the first login binding code is generated by the vehicle based on the in-vehicle system identifier, and the second login binding code may be generated by the mobile terminal based on the first login binding code and the first user account. For example, the mobile terminal generates a third login binding code based on the first user account. The second login binding code may be a combination of the first login binding code and the third login binding code, for example, the third login binding code is added to the first login binding code.

Step 305: The mobile terminal sends a negotiated login binding code message to the vehicle, where the negotiated login binding code message includes the second login binding code.

It should be noted that step 304 and step 305 are optional steps, and are represented by dashed lines in FIG. 11A. If step 304 and step 305 are not performed, that is, a login binding code negotiated by the vehicle and the mobile terminal is the first login binding code. If step 304 and step 305 are performed, that is, a login binding code negotiated by the vehicle and the mobile terminal is the second login binding code.

Optionally, after step 304, the vehicle may further send a negotiation login binding code feedback message to the mobile terminal. The negotiation login binding code feedback message may include an indication message 2 used to indicate that the second login binding code is agreed, or include the second login binding code, or do not include any binding code.

It should be noted that only two implementations of step 300 are listed in FIG. 10A and FIG. 11A. In actual application, there may be another implementation in step 300, that is, the process of negotiating a login binding code by the vehicle and the mobile terminal. The implementations are not enumerated one by one in this embodiment of this application.

For step 401 to step 401 and step 500, refer to the description in Embodiment 5. Details are not described again.

With reference to the accompanying drawings, the following describes an apparatus configured to implement the foregoing methods in embodiments of this application. Therefore, all the foregoing content may be used in the following embodiments. Repeated content is not described again.

Figure 12:
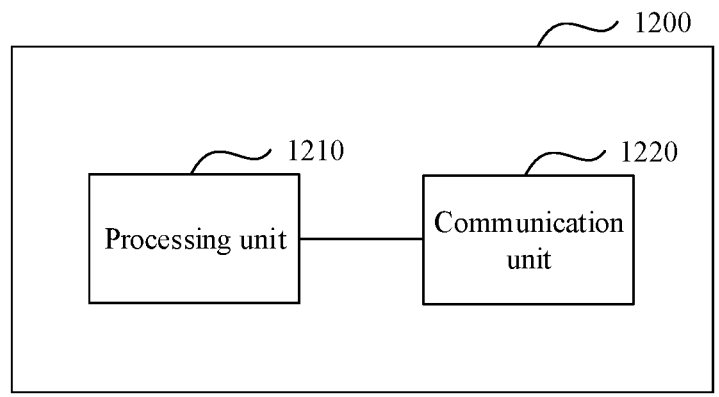
FIG. 12 is a structural block diagram of an apparatus for logging in to an in-vehicle system according to an embodiment of this application.

FIG. 12 is a structural block diagram of an apparatus 1200 for logging in to an in-vehicle system according to an embodiment of this application. For example, the apparatus 1200 for logging in to an in-vehicle system is, for example, the foregoing mobile terminal, vehicle, or network side device. The apparatus 1200 for logging in to an in-vehicle system includes a processing unit 1210 and a communication unit 1220.

In an example, the apparatus 1200 for logging in to an in-vehicle system is the foregoing mobile terminal, or an apparatus that may support the mobile terminal in implementing a function of the method, for example, a chip system. For example, the mobile terminal is a mobile phone.

The processing unit 1210 may be configured to: perform all operations such as step S100 performed by the mobile terminal in the embodiments shown in FIG. 5 to FIG. 11A and FIG. 11B other than receiving and sending operations, and/or support another process of the technology described in this specification. The communication unit 1220 may be configured to perform all sending and receiving operations such as step S200 performed by the mobile terminal in the embodiments shown in FIG. 5 to FIG. 11A and FIG. 11B, and/or support another process of the technology described in this specification.

The communication unit 1220 may be a functional module, and the functional module can complete both a sending operation and a receiving operation. For example, if the communication unit 1220 is a module included in the apparatus 1200 for logging in to an in-vehicle system, the communication unit 1220 may be configured to perform all sending operations and receiving operations performed by the mobile terminal in the embodiments shown in FIG. 5 to FIG. 11A and FIG. 11B. For example, when performing a sending operation, the communication unit 1220 may be considered as a sending module, and when performing a receiving operation, the communication unit 1220 may be considered as a receiving module. Alternatively, the communication unit 1220 may be a general term of two functional modules. The two functional modules are a sending module and a receiving module. The sending module is configured to complete a sending operation. For example, if the communication unit 1220 is a module included in the mobile terminal, the sending module may be configured to perform all sending operations performed by the mobile terminal in the embodiments shown in FIG. 5 to FIG. 11A and FIG. 11B, and the receiving module is configured to complete a receiving operation. For example, the communication unit 1220 is a module included in the mobile terminal, the receiving module may be configured to perform all receiving operations performed by the mobile terminal in the embodiments shown in FIG. 5 to FIG. 11A and FIG. 11B.

For example, the communication unit 1220 is configured to establish a near field communication link to a vehicle, where the vehicle corresponds to the in-vehicle system. The processing unit 1210 is configured to negotiate a login binding code with the vehicle through the near field communication link. The communication unit 1220 is further configured to provide the login binding code to the network side device, where the login binding code is used by the network side device to verify whether the in-vehicle system can be logged in to with the first user account.

In an example, the apparatus 1200 for logging in to an in-vehicle system is the foregoing vehicle, or an apparatus that may support the vehicle in implementing a function of the method, for example, a chip system. The processing unit 1210 may be configured to: perform all operations such as step S700 performed by the vehicle in the embodiments shown in FIG. 5 to FIG. 11A and FIG. 11B other than receiving and sending operations, and/or support another process of the technology described in this specification. The communication unit 1220 may be configured to perform all receiving and sending operations such as step S200 performed by the vehicle in the embodiments shown in FIG. 5 to FIG. 11A and FIG. 11B, and/or support another process of the technology described in this specification.

The communication unit 1220 may be a functional module, and the functional module can complete both a sending operation and a receiving operation. For example, if the communication unit 1220 is a module included in the vehicle, the communication unit 1220 may be configured to perform all sending operations and receiving operations performed by the vehicle in the embodiments shown in FIG. 5 to FIG. 11A and FIG. 11B. For example, when performing a sending operation, the communication unit 1220 may be considered as a sending module, and when performing a receiving operation, the communication unit 1220 may be considered as a receiving module. Alternatively, the communication unit 1220 may be a general term of two functional modules. The two functional modules are a sending module and a receiving module. The sending module is configured to complete a sending operation. For example, if the communication unit 1220 is a module included in the vehicle, the sending module may be configured to perform all sending operations performed by the vehicle in the embodiments shown in FIG. 5 to FIG. 11A and FIG. 11B, and the receiving module is configured to complete a receiving operation. For example, the communication unit 1220 is a module included in the vehicle, the receiving module may be configured to perform all receiving operations performed by the vehicle in the embodiments shown in FIG. 5 to FIG. 11A and FIG. 11B.

For example, the communication unit 1220 is configured to establish a near field communication link to a mobile terminal, where the mobile terminal is configured to send a request for logging in to the in-vehicle system with the first user account; the processing unit 1210 is configured to negotiate a login binding code with the mobile terminal through the near field communication link. The communication unit 1220 is further configured to provide the login binding code to a network side device, where the login binding code is used by the network side device to verify whether the in-vehicle system can be logged in to with the first user account. The communication unit 1220 is further configured to receive a login indication message sent by the network side device, where the login indication message is used to indicate to log in to the in-vehicle system with the first user account. The processing unit 1210 is further configured to log in to the in-vehicle system with the first user account.

In an example, the apparatus 1200 for logging in to an in-vehicle system is the foregoing network side device, or an apparatus that may support the network side device in implementing a function of the method, for example, a chip system. The processing unit 1210 may be configured to: perform all operations such as step S500 performed by the network side device in the embodiments shown in FIG. 5 to FIG. 11A and FIG. 11B other than receiving and sending operations, and/or support another process of the technology described in this specification. The communication unit 1220 may be configured to perform all receiving and sending operations such as step S600 performed by the network side device in the embodiments shown in FIG. 5 to FIG. 11A and FIG. 11B, for example, and/or support another process of the technology described in this specification.

The communication unit 1220 may be a functional module, and the functional module can complete both a sending operation and a receiving operation. For example, if the communication unit 1220 is a module included in the network side device, the communication unit 1220 may be configured to perform all sending operations and receiving operations performed by the network side device in the embodiments shown in FIG. 5 to FIG. 11A and FIG. 11B. For example, when performing a sending operation, the communication unit 1220 may be considered as a sending module, and when performing a receiving operation, the communication unit 1220 may be considered as a receiving module. Alternatively, the communication unit 1220 may be a general term of two functional modules. The two functional modules are a sending module and a receiving module. The sending module is configured to complete a sending operation. For example, if the communication unit 1220 is a module included in the network side device, the sending module may be configured to perform all sending operations performed by the network side device in the embodiments shown in FIG. 5 to FIG. 11A and FIG. 11B, and the receiving module is configured to complete a receiving operation. For example, the communication unit 1220 is a module included in the network side device, the receiving module may be configured to perform all receiving operations performed by the network side device in the embodiments shown in FIG. 5 to FIG. 11A and FIG. 11B.

For example, the processing unit 1210 is configured to verify, based on a login binding code, the first user account, and an in-vehicle system identifier used to identify the in-vehicle system, that the in-vehicle system can be logged in to with the first user account, where the login binding code is used to verify that a near field communication link is established between a mobile terminal and a vehicle, and the vehicle corresponds to the in-vehicle system; and the login binding code is further used to verify that a user holding the mobile terminal requests to log in to the in-vehicle system with the first user account on the vehicle. The communication unit 1220 is further configured to send a login indication message to the vehicle, where the login indication message is used to indicate to log in to the in-vehicle system with the first user account on the vehicle.

In embodiments of this application, division into the units is an example, is merely division into logical functions, and may be other division during actual implementation. In addition, functional units in embodiments of this application may be integrated into one processor, or each of the units may exist alone physically, or two or more units may be integrated into one unit. The integrated unit may be implemented in a form of hardware, or may be implemented in a form of a software function unit.

Only one or more of the units in FIG. 12 may be implemented by software, hardware, firmware, or a combination thereof. The software or firmware includes but is not limited to computer program instructions or code, and may be executed by a hardware processor. The hardware includes but is not limited to various integrated circuits, for example, a central processing unit (CPU), a digital signal processor (DSP), a field programmable gate array (FPGA), or an application-specific integrated circuit (ASIC).

Figure 13:
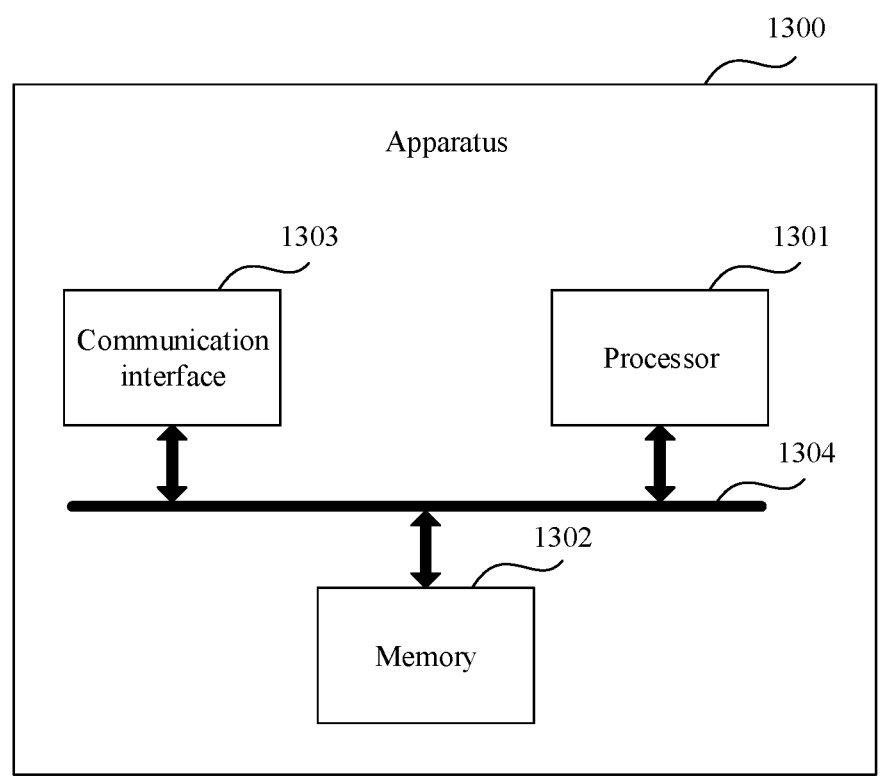
FIG. 13 is a structural block diagram of an apparatus for logging in to an in-vehicle system according to an embodiment of this application.

FIG. 13 is a schematic diagram of hardware of an apparatus 1300 for logging in to an in-vehicle system according to an embodiment of this application. The apparatus 1300 for logging in to an in-vehicle system includes at least one processor 1301, and further includes at least one memory 1302, configured to store program instructions and/or data. The memory 1302 is coupled to the processor 1301. The coupling in this embodiment of this application is an indirect coupling or a communication connection between apparatuses, units, or modules, may be in an electrical form, a mechanical form, or another form, and is used for information exchange between the apparatuses, the units, or the modules. The processor 1301 may perform an operation cooperatively with the memory 1302. The processor 1301 may execute the program instructions stored in the memory 1302. At least one of the at least one memory 1302 may be included in the processor 1301.

The apparatus 1300 for logging in to an in-vehicle system may further include a communication interface 1303, configured to communicate with another device by using a transmission medium, so that the apparatus 1300 for logging in to an in-vehicle system may communicate with the another device. In embodiments of this application, the communication interface may be a transceiver, a circuit, a bus, a module, or a communication interface of another type. In this embodiment of this application, when the communication interface is a transceiver, the transceiver may include an independent receiver and an independent transmitter, or may be a transceiver integrated with a transceiver function, an interface circuit, or the like.

It should be understood that connection media between the processor 1301, the memory 1302, and the communication interface 1303 are not limited in this embodiment of this application. In this embodiment of this application, in FIG. 13, the memory 1302, the processor 1301, and the communication interface 1303 are connected through a communication bus 1304. The bus is represented by using a thick line in FIG. 13. A connection manner between other parts is merely an example for description, and is not limited. The bus may include an address bus, a data bus, a control bus, and the like. For ease of representation, only one thick line is used to represent the bus in FIG. 13, but this does not mean that there is only one bus, only one type of bus, or the like.

In an example, the apparatus 1300 for logging in to an in-vehicle system is configured to implement the steps performed by the mobile terminal in the procedures shown in FIG. 5 to FIG. 11A and FIG. 11B. The apparatus 1300 for logging in to an in-vehicle system may be a mobile terminal, or a chip or a circuit in a mobile terminal. The communication interface 1303 is configured to perform sending and receiving operations of the mobile terminal in the foregoing embodiments. The processor 1301 is configured to perform a related processing operation of the mobile terminal in the foregoing method embodiments.

For example, the communication interface 1303 is configured to establish a near field communication link to a vehicle, where the vehicle corresponds to the in-vehicle system. The processor 1301 is configured to negotiate a login binding code with the vehicle through the near field communication link. The communication interface 1303 is further configured to provide the login binding code to a network side device, where the login binding code is used by the network side device to verify whether the in-vehicle system can be logged in to with the first user account.

In an example, the apparatus 1300 for logging in to an in-vehicle system is configured to implement the steps performed by the vehicle in the procedures shown in FIG. 5 to FIG. 11A and FIG. 11B. The apparatus 1300 for logging in to an in-vehicle system may be the vehicle, or a chip or a circuit in the vehicle. The communication interface 1303 is configured to perform related receiving and sending operations of a vehicle side in the foregoing embodiments. The processor 1301 is configured to perform a related processing operation of a vehicle side in the foregoing method embodiments.

For example, the communication interface 1303 is configured to establish a near field communication link to a mobile terminal, where the mobile terminal is configured to send a request for logging in to the in-vehicle system with the first user account. The processor 1301 is configured to negotiate a login binding code with the mobile terminal through the near field communication link. The communication interface 1303 is further configured to provide the login binding code to a network side device, where the login binding code is used by the network side device to verify whether the in-vehicle system can be logged in to with the first user account. The communication interface 1303 is further configured to receive a login indication message sent by the network side device, where the login indication message is used to indicate to log in to the in-vehicle system with the first user account. The processor 1301 is further configured to log in to the in-vehicle system with the first user account.

In an example, the apparatus 1300 for logging in to an in-vehicle system is configured to implement the steps performed by the network side device in the procedures shown in FIG. 5 to FIG. 11A and FIG. 11B. The apparatus 1300 for logging in to an in-vehicle system may be a network side device, or a chip or a circuit in a network side device. The communication interface 1303 is configured to perform related receiving and sending operations on a network side device side in the foregoing embodiments. The processor 1301 is configured to perform a related processing operation of the network side device side in the foregoing method embodiments.

For example, the processor 1301 is configured to verify, based on a login binding code, the first user account, and an in-vehicle system identifier used to identify the in-vehicle system, that the in-vehicle system can be logged in to with the first user account, where the login binding code is used to verify that a near field communication link is established between a mobile terminal and a vehicle, and the vehicle corresponds to the in-vehicle system; and the login binding code is further used to verify that a user holding the mobile terminal requests to log in to the in-vehicle system with the first user account on the vehicle. The communication interface 1303 is further configured to send a login indication message to the vehicle, where the login indication message is used to indicate to log in to the in-vehicle system with the first user account on the vehicle.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, any conventional processor, or the like. The steps in the methods disclosed with reference to embodiments of this application may be directly performed by a hardware processor, or may be performed by a combination of hardware in the processor and a software module.

In embodiments of this application, the memory may be a nonvolatile memory, for example, a hard disk drive (hard disk drive, HDD) or a solid-state drive (solid-state drive, SSD), or may be a volatile memory (volatile memory) such as a random access memory (random-access memory, RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store the program instructions and/or the data.

All or some of the methods in embodiments of this application may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedures or functions according to the embodiments of the present application are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD for short)), a semiconductor medium (for example, an SSD), or the like.

It is clear that a person skilled in the art can make various modifications and variations to this application without departing from the scope of this application. This application is intended to cover these modifications and variations of this application provided that they fall within the scope of protection defined by the following claims and their equivalent technologies.

In embodiments of this application, "at least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "I" generally indicates an "or" relationship between the associated objects. At least one of the following items (pieces) or a similar expression thereof refers to any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural.

A person skilled in the art should understand that the embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, and computer-implemented processing is generated. Therefore, the instructions executed on the computer or the another programmable device provide steps for implementing a specific function in one or more procedures in the flowcharts and/or in one or more blocks in the block diagrams.

In the several embodiments provided in this application, it should be understood that the disclosed apparatus and method may be implemented in other manners without departing from the scope of this application. For example, the described embodiment is merely an example. For example, division into the modules or units is merely logical function division and may be other division in actual implementation. For example, a plurality of units or components may be combined or integrated into another system, or some features may be ignored or not performed. The units described as separate parts may or may not be physically separate, and parts displayed as units may or may not be physical units, may be located in one position, or may be distributed on a plurality of network units. Some or all of the modules may be selected according to an actual requirement to achieve the objectives of the solutions of the embodiments. A person of ordinary skill in the art may understand and implement embodiments of the present application without creative efforts.

In addition, the apparatus and method described herein, and schematic diagrams of different embodiments can be combined or integrated with other systems, modules, technologies, or methods without departing from the scope of this application. In addition, the displayed or discussed mutual couplings or direct couplings or communication connections may be implemented by using some interfaces. The indirect couplings or communication connections between the apparatuses or units may be implemented in electronic, mechanical, or other forms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus for logging in to an in-vehicle system on a vehicle with a first user account, wherein the vehicle corresponds to the in-vehicle system, the apparatus comprising at least one processor and at least one memory, the at least one memory stores program instructions, and the at least one processor is coupled to the at least one memory to execute the instructions to:
   establish a near field communication link to a mobile terminal that requests for logging in to the in-vehicle system with the first user account;
   negotiate a login binding code with the mobile terminal through the near field communication link, wherein the login binding code is received from a network side device, wherein the negotiate the login binding code with the mobile terminal through the near field communication link comprises;
    receive a first login request message from the mobile terminal through the near field communication link;
    send a second binding code application message to the network side device;
    receive a second binding code feedback message returned by the network side device, wherein the second binding code feedback message comprises the login binding code; and
    send a login request feedback message to the mobile terminal through the near field communication link, wherein the login request feedback message comprises the login binding code;
provide the login binding code to the network side device for verifying whether the in-vehicle system can be logged in to with the first user account, wherein the provide the login binding code to the network side device comprises at least one of:
    indirectly provide the login binding code to the network side device by sending the login request feedback message to the mobile terminal; or
    send a second verification request message to the network side device, wherein the second verification request message comprises the login binding code, and the second verification request message further comprises at least one of the first user account or an in-vehicle system identifier:
receive a login indication message sent by the network side device, wherein the login indication message indicates to log in to the in-vehicle system with the first user account; and
log in to the in-vehicle system with the first user account.

2. The apparatus according to claim 1, wherein the login binding code is generated by the network side device based on at least one of the first user account, a mobile terminal identifier that identifies the mobile terminal, an in-vehicle system identifier that identifies the in-vehicle system, or a vehicle identifier that identifies the vehicle.

3. The apparatus according to claim 1, wherein the second binding code application message comprises the in-vehicle system identifier that identifies the in-vehicle system, and wherein the login binding code corresponds to the in-vehicle system identifier.

4. The apparatus according to claim 1, wherein the second binding code application message comprises the first user account, and wherein the login binding code corresponds to the first user account.

5. The apparatus according to claim 1, wherein the second binding code application message comprises a vehicle identifier that identifies the vehicle, and wherein the login binding code corresponds to the vehicle identifier.

6. The apparatus according to claim 1, wherein the second binding code application message comprises a mobile terminal identifier that identifies the mobile terminal, and wherein the login binding code corresponds to the mobile terminal identifier.

7. The apparatus according to claim 1, wherein the login request feedback message comprises a mobile terminal identifier that identifies the mobile terminal.

8. The apparatus according to claim 1, wherein the second verification request message comprises a mobile terminal identifier that identifies the mobile terminal.

9. An apparatus for a mobile terminal to request to log in to an in-vehicle system with a first user account, comprising at least one processor and at least one memory, wherein the at least one memory stores program instructions, and the at least one processor is coupled to the at least one memory to execute the instructions to:
    establish a near field communication link to a vehicle, wherein the vehicle corresponds to the in-vehicle system;
    negotiate a login binding code with the vehicle through the near field communication link, wherein the login binding code is received from a network side device, wherein the negotiate the login binding code with the vehicle through the near field communication link comprises:
        send a first binding code application message to the network side device;
        receive a first binding code feedback message returned by the network side device, wherein the first binding code feedback message comprises the login binding code; and
        send a third verification request message or a second login request message to the vehicle through the near field communication link, wherein the third verification request message or the second login request message comprises the login binding code; and
    provide the login binding code to a network side device for verifying whether the in-vehicle system can be logged in to with the first user account, wherein the provide the login binding code to the network side device comprises at least one of:
        indirectly provide the login binding code to the network side device by sending the third verification request message to the vehicle; or
        send a first verification request message to the network side device, wherein the first verification request message comprises the login binding code, and the first verification request message further comprises at least one of the first user account or an in-vehicle system identifier.

10. The apparatus according to claim 9, wherein the login binding code is generated by the network side device based on at least one of the first user account, a mobile terminal identifier that identifies the mobile terminal, an in-vehicle system identifier that identifies the in-vehicle system, or a vehicle identifier that identifies the vehicle.

11. The apparatus according to claim 9, wherein the third verification request message comprises the first user account.

12. The apparatus according to claim 9, wherein the second login request message comprises the first user account.

13. The apparatus according to claim 9, wherein the third verification request message comprises a mobile terminal identifier that identifies the mobile terminal.

14. The apparatus according to claim 9, wherein the second login request message comprises a mobile terminal identifier that identifies the mobile terminal.

15. An apparatus for logging in to an in-vehicle system on a vehicle with a first user account, wherein the vehicle corresponds to the in-vehicle system, the apparatus comprising at least one processor and at least one memory, the at least one memory stores program instructions, and the at least one processor is coupled to the at least one memory to execute the instructions to:
    establish a near field communication link to a mobile terminal that requests for logging in to the in-vehicle system with the first user account;
    negotiate a login binding code with the mobile terminal through the near field communication link, wherein the login binding code is received from a network side device, wherein the negotiate the login binding code with the mobile terminal through the near field communication link comprises;

receive a third verification request message or a second login request message from the mobile terminal through the near field communication link, wherein the third verification request message or the second login request message comprises the login binding code, and the login binding code is requested from the network side device by the mobile terminal;

provide the login binding code to the network side device for verifying whether the in-vehicle system can be logged in to with the first user account, wherein the provide the login binding code to the network side device comprises send a second verification request message to the network side device, wherein the second verification request message comprises the login binding code;

receive a login indication message sent by the network side device, wherein the login indication message indicates to log in to the in-vehicle system with the first user account; and log in to the in-vehicle system with the first user account.

16. The apparatus according to claim 15, wherein the second verification request message comprises a mobile terminal identifier that identifies the mobile terminal.

17. The apparatus according to claim 15, wherein the second login request message comprises a mobile terminal identifier that identifies the mobile terminal.

18. The apparatus according to claim 15, wherein the second login request message comprises the first user account.

19. The apparatus according to claim 15, wherein the third verification request message comprises the first user account.

20. The apparatus according to claim 15, wherein the third verification request message comprises a mobile terminal identifier that identifies the mobile terminal.

* * * * *